(12) United States Patent
Williams et al.

(10) Patent No.: US 7,926,844 B2
(45) Date of Patent: Apr. 19, 2011

(54) AIRBAG ASSEMBLY AND METHOD OF PACKING

(75) Inventors: Jeffrey D. Williams, Roy, UT (US); Cheong (Aaron) Chook Ching, Kuala Lumpur (MY)

(73) Assignee: Autoliv ASP, Inc., Ogden, UT (US)

( * ) Notice: Subject to any disclaimer, the term of this patent is extended or adjusted under 35 U.S.C. 154(b) by 157 days.

(21) Appl. No.: 12/100,465

(22) Filed: Apr. 10, 2008

(65) Prior Publication Data
US 2009/0256340 A1 Oct. 15, 2009

(51) Int. Cl.
*B60R 21/237* (2006.01)
(52) U.S. Cl. ............................ 280/743.1; 280/732
(58) Field of Classification Search ............ 280/743.1, 280/732; *B60R 21/237*
See application file for complete search history.

(56) References Cited

U.S. PATENT DOCUMENTS

| | | | |
|---|---|---|---|
| 3,748,477 A * | 7/1973 | Wulbrecht | 280/743.2 |
| 4,235,453 A * | 11/1980 | Lawson et al. | 280/743.1 |
| 4,286,954 A * | 9/1981 | McArthur et al. | 493/244 |
| 4,351,544 A * | 9/1982 | Ross | 280/743.1 |
| 4,842,300 A | 6/1989 | Ziomek et al. | |
| 5,004,266 A | 4/1991 | Miller et al. | |
| 5,022,675 A * | 6/1991 | Zelenak et al. | 280/743.1 |
| 5,140,799 A | 8/1992 | Satoh | |
| 5,178,407 A * | 1/1993 | Kelley | 280/728.1 |
| 5,240,282 A * | 8/1993 | Wehner et al. | 280/728.1 |
| 5,246,250 A | 9/1993 | Wolanin et al. | |
| 5,290,061 A * | 3/1994 | Bollaert | 280/743.1 |
| 5,310,216 A | 5/1994 | Wehner et al. | |
| 5,346,248 A | 9/1994 | Rhein et al. | |
| 5,391,137 A | 2/1995 | DePoy et al. | |
| 5,398,968 A * | 3/1995 | Emambakhsh et al. | 280/743.1 |
| 5,407,227 A | 4/1995 | Lauritzen et al. | |
| 5,419,579 A | 5/1995 | McPherson et al. | |
| 5,425,551 A | 6/1995 | Hawthorn | |
| 5,447,329 A | 9/1995 | Hamada | |
| 5,452,913 A | 9/1995 | Hansen | |
| 5,454,595 A | 10/1995 | Olson et al. | |
| 5,492,363 A | 2/1996 | Hartmeyer et al. | |
| 5,492,367 A * | 2/1996 | Albright et al. | 280/743.1 |
| 5,496,056 A * | 3/1996 | Dyer | 280/728.1 |
| 5,531,477 A | 7/1996 | Madrigal et al. | |
| 5,538,281 A | 7/1996 | Patercsak | |
| 5,570,905 A | 11/1996 | Dyer | |
| 5,588,674 A | 12/1996 | Yoshimura et al. | |

(Continued)

FOREIGN PATENT DOCUMENTS

JP 06255437 A * 9/1994

(Continued)

OTHER PUBLICATIONS

Notice of Allowance issued Jun. 23, 2010 in co-pending U.S. Appl. No. 12/349,341, now published as U.S. Publication No. US-2009-0108574.

(Continued)

*Primary Examiner* — Paul N Dickson
*Assistant Examiner* — Nicole Verley
(74) *Attorney, Agent, or Firm* — Sally J. Brown; Stoel Rives LLP

(57) ABSTRACT

Embodiments herein include inflatable cushion airbag assemblies and methods for folding, rolling, and packing an airbag cushion within a housing such that the cushion deploys with predetermined characteristics.

16 Claims, 9 Drawing Sheets

U.S. PATENT DOCUMENTS

| | | | |
|---|---|---|---|
| 5,613,698 A | 3/1997 | Patercsak et al. | |
| 5,630,614 A | 5/1997 | Conlee | |
| 5,694,737 A | 12/1997 | Lunt et al. | |
| 5,732,973 A | 3/1998 | Turnbull et al. | |
| 5,755,459 A | 5/1998 | LaLonde | |
| 5,765,867 A | 6/1998 | French | |
| 5,772,239 A | 6/1998 | Seymour | |
| 5,823,566 A | 10/1998 | Manire | |
| 5,823,567 A | 10/1998 | Behr et al. | |
| 5,899,495 A | 5/1999 | Yamamoto et al. | |
| 5,957,486 A * | 9/1999 | Taguchi et al. | 280/729 |
| 5,979,937 A | 11/1999 | Yoshida et al. | |
| 6,029,996 A * | 2/2000 | Yoshioka et al. | 280/740 |
| 6,056,318 A | 5/2000 | Braunschadel | |
| 6,110,094 A | 8/2000 | Wallentin et al. | |
| 6,131,944 A | 10/2000 | Henkel et al. | |
| 6,142,517 A | 11/2000 | Nakamura et al. | |
| 6,155,598 A | 12/2000 | Kutchey | |
| 6,186,544 B1 * | 2/2001 | Igawa | 280/743.1 |
| 6,196,585 B1 * | 3/2001 | Igawa | 280/743.1 |
| 6,203,062 B1 * | 3/2001 | Kusaka et al. | 280/743.1 |
| 6,286,866 B1 | 9/2001 | Satge et al. | |
| 6,299,202 B1 * | 10/2001 | Okada et al. | 280/732 |
| 6,352,283 B1 | 3/2002 | Ellerbrok et al. | |
| 6,371,510 B1 | 4/2002 | Marriott et al. | |
| 6,390,500 B1 | 5/2002 | Yamada et al. | |
| 6,398,258 B2 | 6/2002 | Hamada et al. | |
| 6,432,033 B1 | 8/2002 | Salzmann et al. | |
| 6,474,686 B1 | 11/2002 | Higuchi et al. | |
| 6,499,765 B2 * | 12/2002 | Hawthorn et al. | 280/743.1 |
| 6,557,891 B2 * | 5/2003 | Okada et al. | 280/743.1 |
| 6,619,691 B1 * | 9/2003 | Igawa | 280/732 |
| 6,669,229 B2 | 12/2003 | Thomas | |
| 6,682,093 B2 | 1/2004 | Tajima et al. | |
| 6,692,024 B2 | 2/2004 | Fischer et al. | |
| 6,739,622 B2 * | 5/2004 | Halford et al. | 280/743.1 |
| 6,767,030 B2 | 7/2004 | Yamaji et al. | |
| 6,830,266 B2 * | 12/2004 | Abe | 280/743.1 |
| 6,832,779 B2 * | 12/2004 | Tajima et al. | 280/743.1 |
| 6,874,810 B2 | 4/2005 | Soderquist | |
| 6,877,772 B2 | 4/2005 | Fischer et al. | |
| 6,883,381 B2 | 4/2005 | Kolb et al. | |
| 6,883,831 B2 | 4/2005 | Hawthorn et al. | |
| 6,887,772 B2 | 4/2005 | Fischer et al. | |
| 6,942,242 B2 | 9/2005 | Hawthorn et al. | |
| 6,945,562 B2 | 9/2005 | Abe | |
| 6,955,377 B2 | 10/2005 | Cooper et al. | |
| 6,971,671 B2 | 12/2005 | Schneider et al. | |
| 6,988,743 B2 * | 1/2006 | Okamoto et al. | 280/743.1 |
| 7,083,191 B2 | 8/2006 | Fischer | |
| 7,150,470 B2 * | 12/2006 | Okada et al. | 280/743.1 |
| 7,223,224 B2 | 5/2007 | Card et al. | |
| 7,232,153 B2 | 6/2007 | Kawauchimaru et al. | |
| 7,237,802 B2 | 7/2007 | Rose et al. | |
| 7,293,795 B2 * | 11/2007 | Kong | 280/732 |
| 7,347,450 B2 | 3/2008 | Williams et al. | |
| 7,404,570 B2 | 7/2008 | Miyata | |
| 7,441,804 B2 * | 10/2008 | Rose et al. | 280/743.1 |
| 7,441,805 B2 * | 10/2008 | Jamison et al. | 280/743.2 |
| 7,445,239 B2 * | 11/2008 | Okada et al. | 280/743.1 |
| 7,481,455 B2 * | 1/2009 | Iida et al. | 280/743.1 |
| 7,530,597 B2 * | 5/2009 | Bito | 280/742 |
| 7,735,862 B2 | 6/2010 | Choi | |
| 2002/0020990 A1 | 2/2002 | Sinnhuber et al. | |
| 2003/0001366 A1 * | 1/2003 | Debler et al. | 280/732 |
| 2003/0189319 A1 | 10/2003 | Soderquist | |
| 2003/0234520 A1 | 12/2003 | Hawthorn et al. | |
| 2004/0251669 A1 * | 12/2004 | Fischer et al. | 280/743.1 |
| 2005/0134032 A1 | 6/2005 | Downing et al. | |
| 2006/0012157 A1 * | 1/2006 | Ishiguro et al. | 280/731 |
| 2006/0131847 A1 | 6/2006 | Sato et al. | |
| 2006/0244248 A1 | 11/2006 | Rose et al. | |
| 2007/0052221 A1 * | 3/2007 | Okada et al. | 280/735 |
| 2007/0057487 A1 | 3/2007 | Kim | |
| 2007/0120346 A1 | 5/2007 | Kwon | |
| 2007/0126219 A1 | 6/2007 | Williams | |
| 2007/0138779 A1 | 6/2007 | Kwon | |
| 2007/0170710 A1 | 7/2007 | Bouquier | |
| 2007/0278772 A1 | 12/2007 | Burghardt et al. | |
| 2008/0023950 A1 | 1/2008 | Kalczynski et al. | |
| 2008/0203713 A1 | 8/2008 | McFadden et al. | |
| 2008/0217887 A1 | 9/2008 | Seymour et al. | |
| 2008/0217892 A1 | 9/2008 | Maripudi | |
| 2008/0284140 A1 | 11/2008 | Choi | |
| 2009/0039630 A1 | 2/2009 | Schneider et al. | |
| 2009/0102173 A1 | 4/2009 | Rose et al. | |
| 2009/0108574 A1 | 4/2009 | Lachat et al. | |
| 2009/0152842 A1 | 6/2009 | Benny et al. | |
| 2009/0256340 A1 | 10/2009 | Williams et al. | |

FOREIGN PATENT DOCUMENTS

| | | |
|---|---|---|
| JP | 2005 343267 | 12/2005 |
| WO | WO 2008/109202 | 9/2008 |

OTHER PUBLICATIONS

International Search Report/Written Opinion from PCT International Application No. PCT/US2008/052201 dated Aug. 1, 2008, now published as WO 2008/109202.

U.S. Appl. No. 12/580,488, filed Oct. 16, 2009, for Inflatable Airbag Cushions With Deployment Flaps and Methods for Folding.

\* cited by examiner

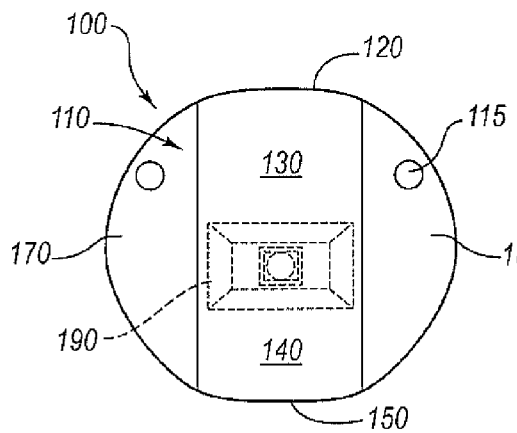
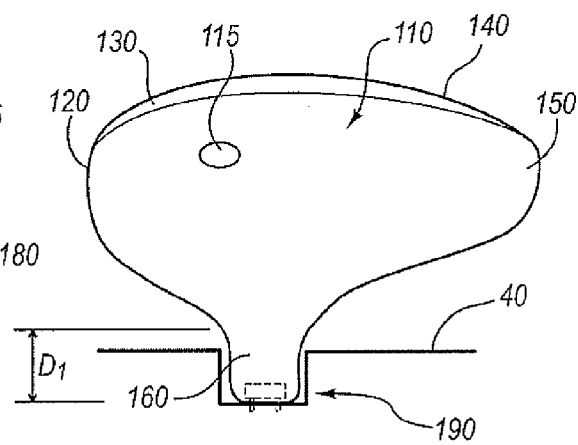
FIG. 1A    FIG. 1B
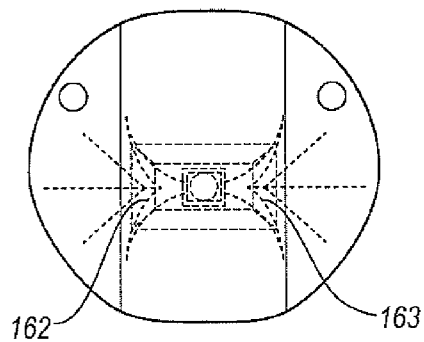
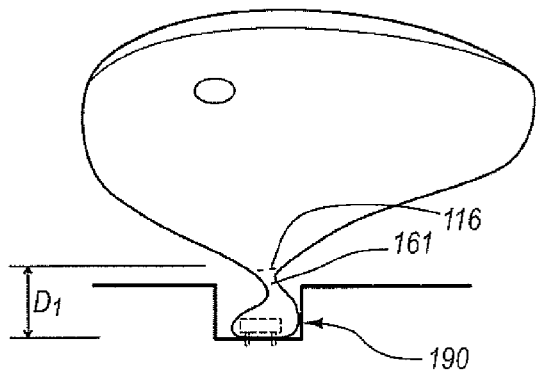
FIG. 1C    FIG. 1D
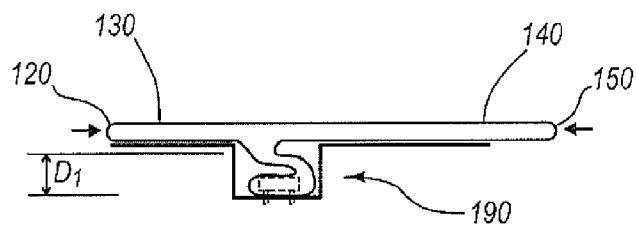
FIG. 1E
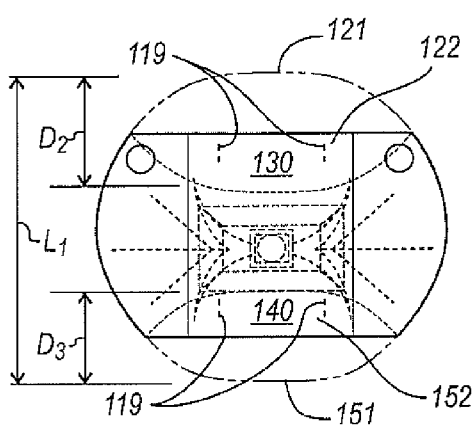
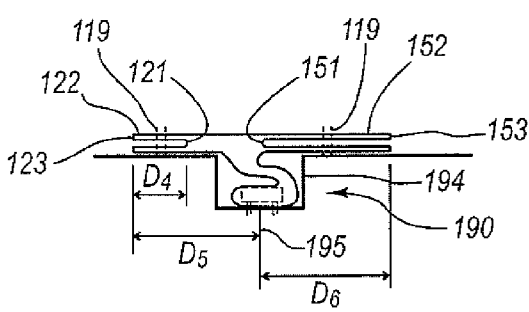
FIG. 1F    FIG. 1G

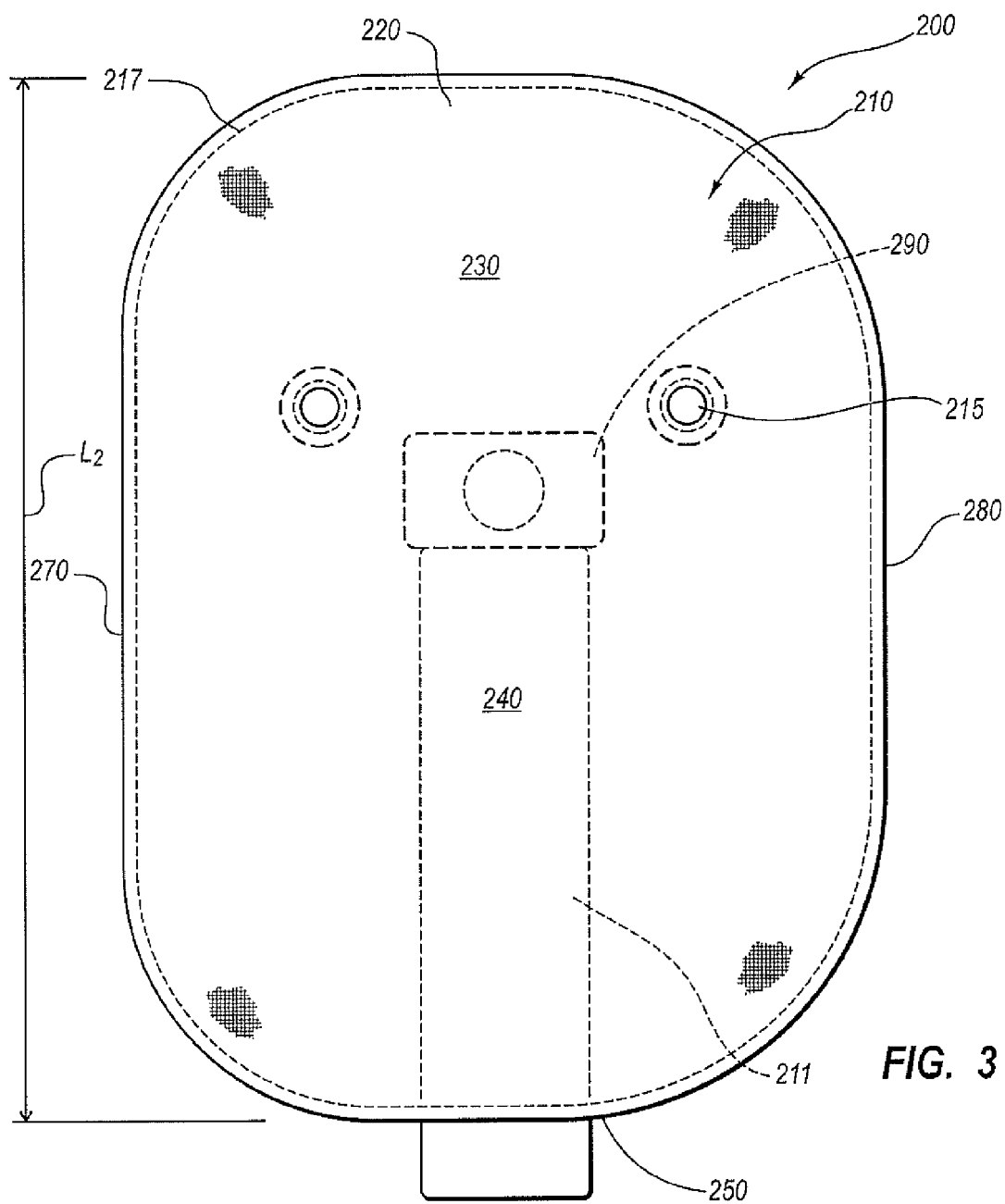
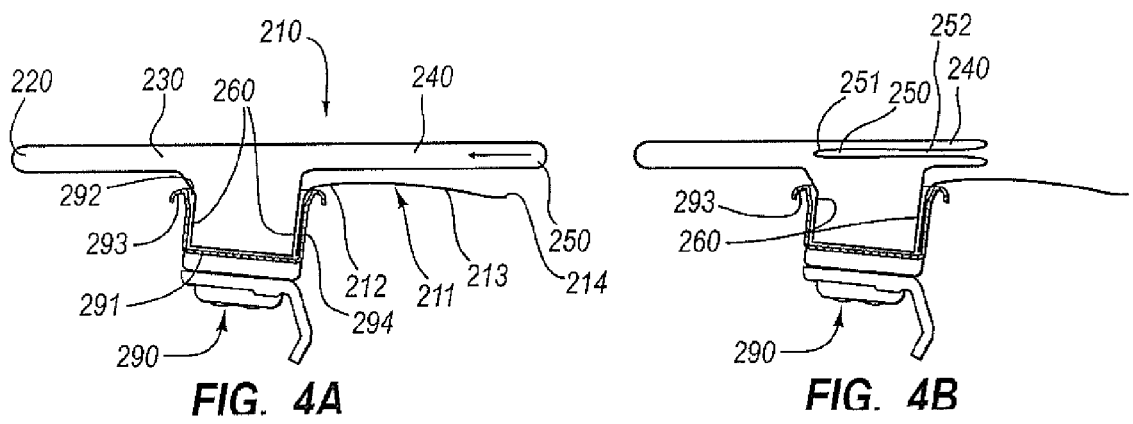
FIG. 3
FIG. 4A
FIG. 4B

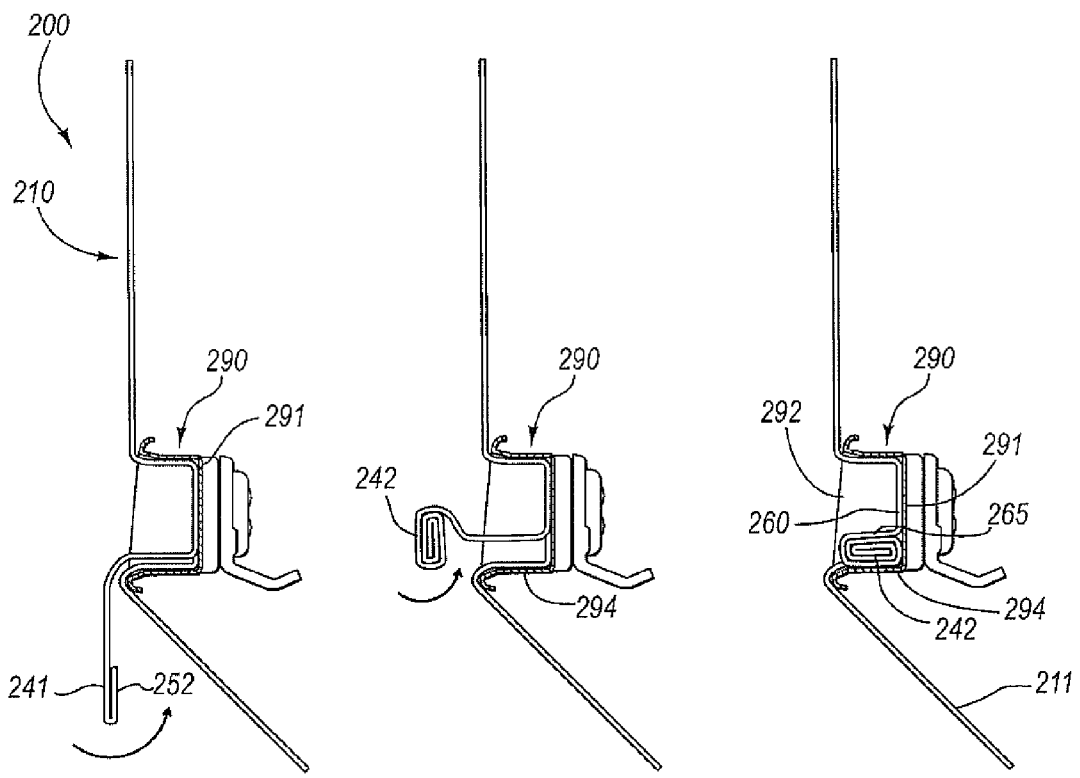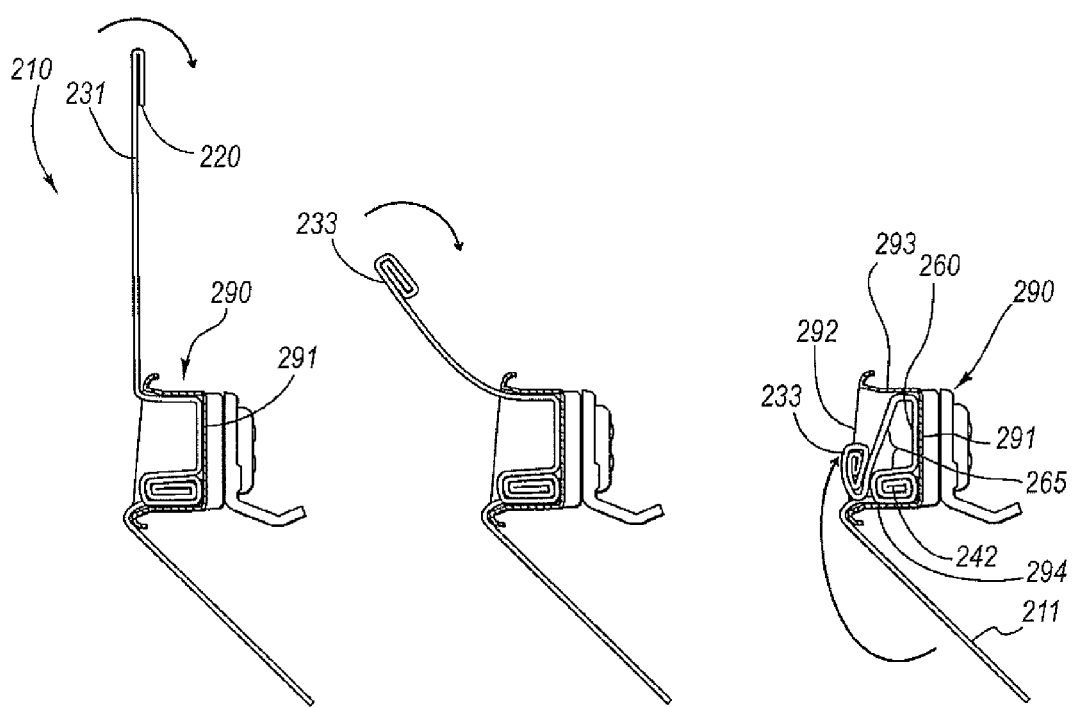

AIRBAG ASSEMBLY AND METHOD OF PACKING

TECHNICAL FIELD

The present invention relates generally to the field of automotive protective systems. More specifically, the present invention relates to front airbag systems, especially the folding and packaging of airbags so that an airbag cushion deploys with a predetermined characteristic.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 1A is a top elevation view of one embodiment of a portion of an inflatable airbag assembly;

FIG. 1B is a side elevation cutaway view of the embodiment of the inflatable airbag assembly of FIG. 1A;

FIG. 1C is a top elevation view of the embodiment of the inflatable airbag assembly of FIG. 1A, wherein the airbag cushion has undergone a first step of a method for folding an airbag cushion;

FIG. 1D is a side elevation cutaway view of the embodiment of the inflatable airbag assembly as depicted in FIG. 1C;

FIG. 1E is a side elevation cutaway view of the embodiment of the inflatable airbag assembly of FIG. 1A, wherein the airbag cushion has undergone an additional step of a method for folding an airbag cushion;

FIG. 1F is a top elevation view of the embodiment of the inflatable airbag assembly of FIG. 1A, wherein the airbag cushion has undergone additional steps of a method for folding an airbag cushion;

FIG. 1G is a side elevation cutaway view of the embodiment of the inflatable airbag assembly as depicted in FIG. 1F;

FIG. 3 is a front elevation view of a portion of another embodiment of an inflatable airbag assembly;

FIG. 4A is a side elevation cutaway view of the embodiment of the inflatable airbag assembly of FIG. 3;

FIG. 4B is a side elevation cutaway view of the embodiment of the inflatable airbag assembly of FIG. 3, wherein the airbag cushion has undergone a first step of a method for folding an airbag cushion;

FIG. 6A is a side elevation cutaway view of the embodiment of the inflatable airbag assembly of FIG. 3, wherein the airbag cushion is undergoing an additional step of a method for folding an airbag cushion;

FIG. 6B is a side elevation cutaway view of the embodiment of the inflatable airbag assembly as depicted in FIG. 6A, wherein the airbag cushion is at a later stage of the step of a method for folding an airbag cushion;

FIG. 6C is a side elevation cutaway view of the embodiment of the inflatable airbag assembly of FIG. 3, wherein the airbag cushion has undergone an additional step of a method for folding an airbag cushion;

FIG. 6D is a side elevation cutaway view of the embodiment of the inflatable airbag assembly of FIG. 3, wherein the airbag cushion is undergoing an additional step of a method for folding an airbag cushion;

FIG. 6E is a side elevation cutaway view of the embodiment of the inflatable airbag assembly as depicted in FIG. 6D, wherein the airbag cushion is at a later stage of the step of a method for folding an airbag cushion;

FIG. 6F is a side elevation cutaway view of the embodiment of the inflatable airbag assembly of FIG. 6D, wherein the airbag cushion has undergone an additional step of a method for folding an airbag cushion, and the next step of the method is depicted;

Figure 1H:
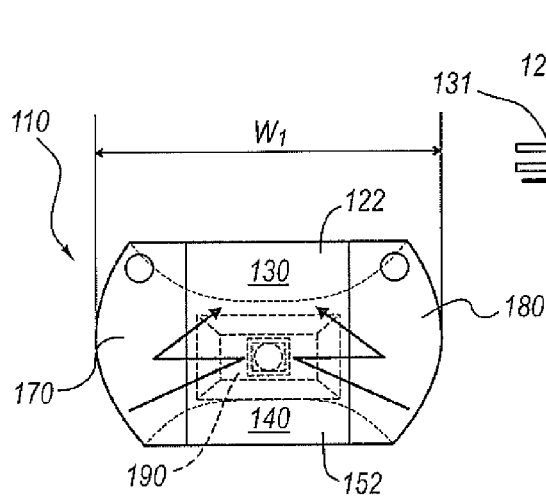
FIG. 1H is a top elevation view of the embodiment of the inflatable airbag assembly of FIG. 1A, depicting a step of a method for folding an airbag cushion.

INDEX OF ELEMENTS IDENTIFIED IN THE DRAWINGS 10 vehicle
15 instrument panel
20 windshield
30 plate
40 table
100 inflatable airbag cushion assembly
110 airbag cushion
111 flap
112 deployment portion of flap
113 extension portion of flap
114 free end of flap
115 vent
116 tack stitch
118 cosmetic cover
119 tear stitching
120 top portion of cushion
121 leading edge of tucked top portion
122 tucked top portion
123 top edge of tucked bottom portion
130 upper occupant portion of cushion
131 left and right accordion-folded portions of upper portion
132 bottom edge of accordion-folded upper portion
140 lower occupant portion of cushion
141 left and right accordion-folded portions of lower portion
142 rolled left and right accordion-folded portions of lower portion
150 bottom portion of cushion
151 leading edge of tucked bottom portion
152 tucked bottom portion
153 bottom edge of tucked portion
160 base portion of cushion
161 tucked base portion of cushion
162 left portion of base
163 right portion of base
165 throat portion of base
170 left portion of cushion
171 left accordion-folded portion
180 right portion of cushion
181 right accordion-folded portion
190 housing
191 base of housing
192 open face of housing
193 cabin-distal side
194 cabin-proximal side
195 midline of housing
200 inflatable airbag cushion assembly
210 airbag cushion
211 flap
212 deployment portion of flap
213 extension portion of flap
214 free end of flap
215 vent
217 stitching
218 cosmetic cover
219 tear stitching
220 top portion of cushion
221 tucked top portion
230 upper occupant portion of cushion
231 left and right accordion-folded portions of upper portion
233 rolled left and right accordion-folded portions of upper portion
240 lower occupant portion of cushion
241 left and right accordion-folded portions of lower portion
242 rolled left and right accordion-folded portions of lower portion
250 bottom portion of cushion
251 leading edge of tuck
252 tucked bottom portion
260 base portion of cushion
264 fold
265 throat of cushion
266 top portion of throat
267 bottom portion of throat
270 left portion of cushion
271 accordion-folds of left portion
280 right portion of cushion
281 accordion-folds of right portion
290 housing
291 base of housing
292 exit face of housing
293 cabin-distal side
294 cabin-proximal side
295 interior space
300 airbag assembly
302 inflator
305 diffuser
310 airbag cushion
333 rolled left and right accordion-folded portions of upper portion
334 first reverse roll
342 rolled left and right accordion-folded portions of lower portion
364 fold
390 housing
391 base of housing
392 exit face of housing
393 cabin-distal side
394 cabin-proximal side
395 interior space

DETAILED DESCRIPTION

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The phrases "connected to", "coupled to" and "in communication with" refer to any form of interaction between two or more entities, including mechanical, electrical, magnetic, electromagnetic, fluid and thermal interaction. Two components may be coupled to each other even though they are not in direct contact with each other. The phrases "attached to" or "attached directly to" refer to interaction between two or more entities which are in direct contact with each other or are separated by a fastener.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Front airbags are typically installed in the steering wheel and instrument panel of a vehicle. During installation, the airbags are rolled, folded, or both, and are retained in the rolled/folded state behind a cosmetic cover. During a collision event, vehicle sensors trigger the activation of an inflator, which rapidly fills the airbag with inflation gas. Thus, the airbag rapidly changes confirmations from the rolled/folded configuration to an expanded configuration and provides restraint for the occupant. The method by which the airbag is folded and thereby packaged in to the airbag housing contributes to airbag cushion deployment trajectory and behavior.

Conventionally, airbag deployment may be problematic when an occupant is out of position, such as being positioned too closely to the airbag or when an object is considered out of position, such as a rear-facing infant car seat in a front passenger seat of a vehicle. Often, occupants positioned too closely to the airbag or the panel from which the airbag deploys are of a smaller than average stature, such as for instance, children. Incorrect positioning of the occupant causes the airbag to contact them during deployment, especially if the airbag does not remain as close as possible to the instrument panel during deployment.

An additional common factor that may be important during airbag deployment is the configuration of the vehicle panel from which the airbag deploys. In some cases, the panel in which the airbag housing is installed may be substantially horizontal, such that the face of the housing from which the airbag deploys is upwardly oriented. Particularly in the case of front passenger airbags, a housing which contains the folded, undeployed airbag may be in close proximity to a vehicle's windshield, and the rake of the windshield may be such that there is a small space through which the airbag deploys. Windshield rake is discussed in more detail within text associated with FIG. 2A, below.

Therefore, it would be advantageous to provide an airbag that comprised deployment characteristics that tended to minimize occupant contact during deployment, including a substantially horizontal trajectory, and deploying close to the instrument panel. Additionally, it would be advantageous if the airbag were able to vent inflation gas from the airbag to soften it for small occupants, or occupants out of position.

Embodiments disclosed herein include an airbag assembly comprising an airbag cushion, which further comprises closeable vents and vent tethers. Also disclosed is a method for folding an airbag such that it deploys as close to an instrument panel as possible and such that it is suitable for use in vehicles where the airbag must be located close to a windshield.

Figure 2A:
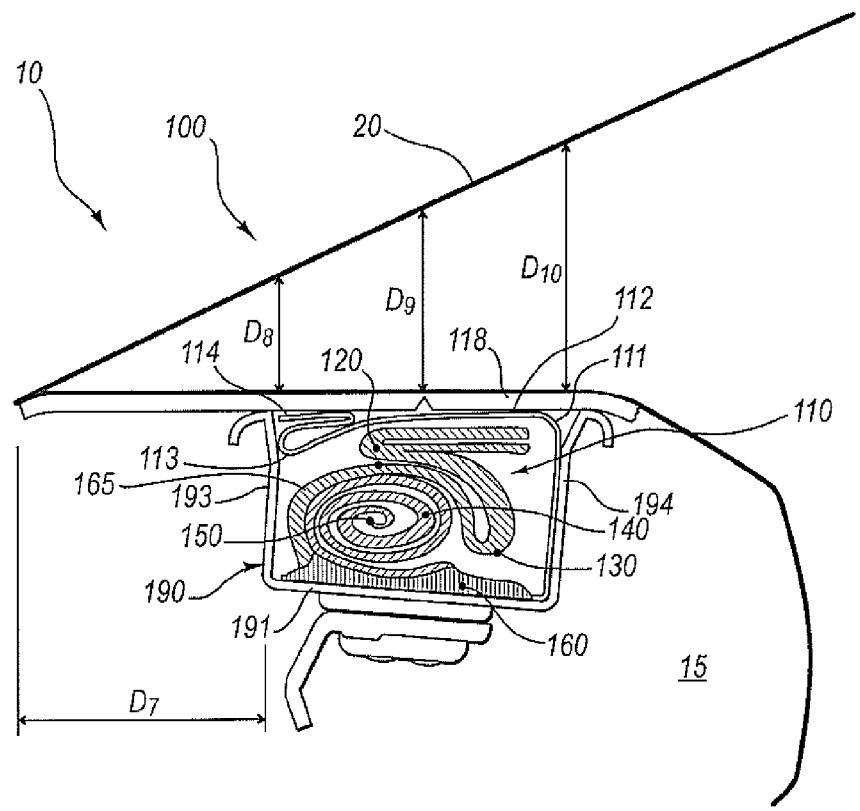
FIG. 2A is a side elevation cutaway view of the embodiment of the inflatable airbag assembly of FIG. 1A, wherein the airbag cushion has completed a method for folding an airbag cushion and is installed in a vehicle.

When describing an airbag it is helpful to make use of directional references such as top, bottom, left, and right. It should be understood that the aforementioned directions are used in reference to a person viewing a fully inflated airbag cushion, as depicted in FIG. 2E, from a normal occupant position with a vehicle that is normally positioned with its wheels on the ground.

FIG. 1A depicts an inflatable airbag cushion assembly 100 from a top elevation view. Airbag assembly 100 may comprise a cushion 110, a flap (not shown) a housing 190, and an inflator (not shown). The flap is discussed within text accompanying FIG. 2A, below. Cushion 110 can be anchored to housing 190, and typically, a path for inflation gas exists such that cushion 110 can be in fluid communication with an inflator via housing 190.

Cushion 110 may be attached to or coupled to housing 190 using techniques and materials which are well known in the art. Additionally, housing 190 may be one of several different types of airbag housing; such as fabric soft-pack housing, or a rigid housing comprising plastic, metal, or a combination of the two. Housing 190 may also comprise an extended portion, which defines a vehicle attachment member. Housing 190 may further comprise a base 191, an open face 192, a cabin-distal side 193, and a cabin-proximal side 194, as depicted in FIG. 2A. In a fully packaged state, wherein the housing contains a folded, rolled, and wrapped cushion, open face 192 may be considered as an airbag exit face of housing 190. Finally, an inflator may be disposed within the housing or may be positioned outside the housing, but in fluid communication with the airbag via the housing.

Figure 1I:
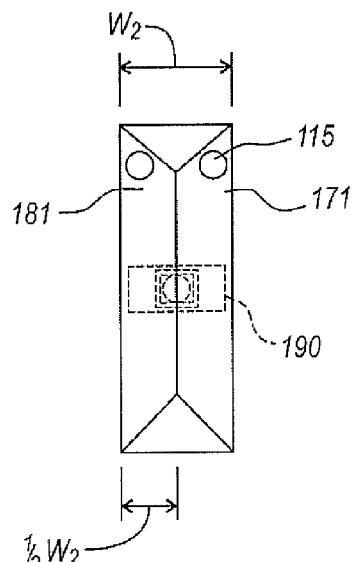
FIG. 1I is a top elevation view of the embodiment of the inflatable airbag assembly of FIG. 1A, wherein the airbag cushion has undergone additional steps of a method for folding an airbag cushion.
Figure 1J:
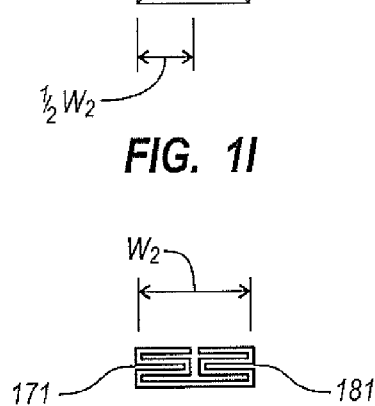
FIG. 1J is a front elevation view of the embodiment of the inflatable airbag assembly as depicted in FIG. 1I.
Figure 1K:
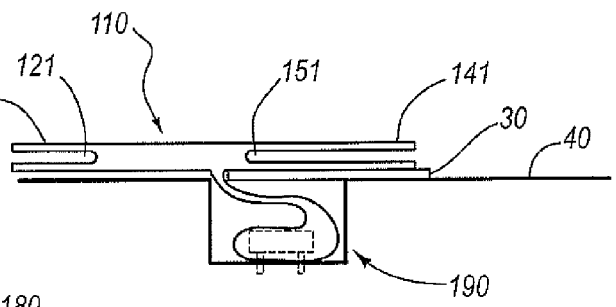
FIG. 1K is a side elevation cutaway view of the embodiment of the inflatable airbag assembly as depicted in FIG. 1I.
Figure 1L:
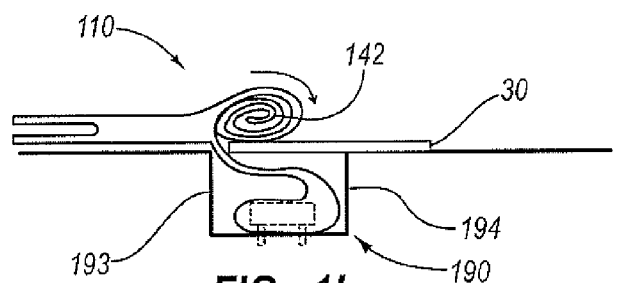
FIG. 1L is a side elevation cutaway view of the embodiment of the inflatable airbag assembly of FIG. 1, wherein the airbag cushion has undergone an additional step of a method for folding an airbag cushion.
Figure 1M:
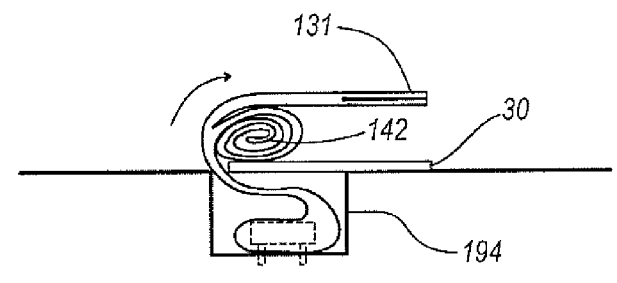
FIG. 1M is a side elevation cutaway view of the embodiment of the inflatable airbag assembly of FIG. 1A, wherein the airbag cushion has undergone an additional step of a method for folding an airbag cushion.
Figure 1N:
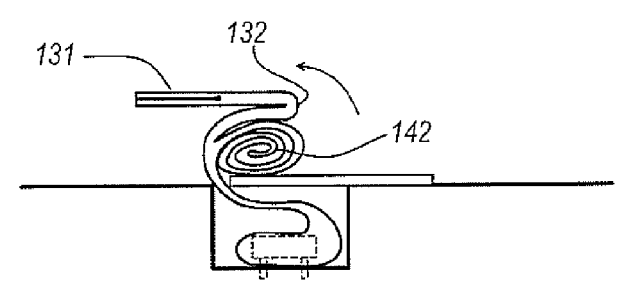
FIG. 1N is a side elevation cutaway view of the embodiment of the inflatable airbag assembly of FIG. 1A, wherein the airbag cushion has undergone an additional step of a method for folding an airbag cushion.
Figure 1O:
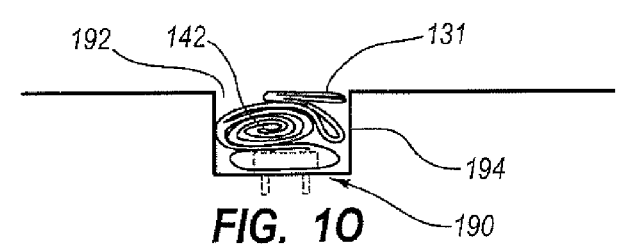
FIG. 1O is a side elevation cutaway view of the embodiment of the inflatable airbag assembly of FIG. 1A, wherein the airbag cushion has undergone an additional step of a method for folding an airbag cushion.

To increase the clarity of the illustrations, the flap has been omitted from airbag assembly 100 depictions in FIGS. 1A-1O. Illustrations depicting the flap may be found in FIGS. 2A-2E and information regarding the flap may be found in the text associated with those FIGS.

The shape of cushion 110 depicted herein is for illustrative purposes only, and may be altered. Cushion 110 may comprise a contiguous piece of material manufactured using a one-piece woven technique or may be manufactured by cutting and sewing two pieces of a nylon fabric. The above techniques and the material are well known in the art. Cushion 110 comprises a first side and a second side of material, which define a void between them, into which inflation gas may be forced thereby inflating the cushion.

With reference now to FIGS. 1A, 1B, and 2E, different portions of cushion 110 will be further described. Different portions of cushion 110 are described by their functions or by their positions during full airbag deployment in a vehicle that is normally positioned with its wheels on the ground, as depicted in FIG. 2E. Note that in the views of FIGS. 1B, 1D, 1E, 1G, 1K, and 1L-O, airbag assembly is depicted as being disposed on an assembly table 40, wherein the housing may be placed below a top surface of table 40 such that cushion 110 may be laid out in a flattened and horizontal conformation. Additionally, The apparent inflation of cushion 110 depicted in FIGS. 1B and 1D is strictly for illustrative purposes only, and does not represent a step in the disclosed method for packaging cushion 110.

Top portion 120 partially defines a portion of cushion 110 that partially lies along and contacts a windshield 20 of a vehicle 10. Top portion 120 defines the top part of cushion 110, including the top part of left and right sides as well as most of a back side and the top part of a front side.

Upper occupant portion 130 defines an upper front portion of cushion 110, which is most likely to cushion an upper portion of an occupant. Lower occupant portion 140 defines a lower front portion of cushion 100, which is most likely to cushion a lower portion of an occupant. Portion 140 may be slightly conical in shape with the wide portion of the cone oriented up. Portion 140 is sometimes called a "nose" portion of an airbag cushion. However, cushion 110 does not necessarily comprise a portion shaped like a nose.

Bottom portion 150 defines the lowest portion of cushion 110 and may be described as being the bottom of the nose, or the bottom of lower portion 140. Base portion 160 is that portion of cushion 110 that is within housing 190 and may directly contact housing 190. Base portion may further 160 comprise an attachment point where cushion 110 is anchored to housing 190, and it is via base portion 190 that inflation gas first enters cushion 110. Base portion 160 may further comprise an extended portion which is sometimes called an airbag neck or throat portion.

The various portions of cushion 110 do not necessarily comprise separate panels of material. Furthermore, there may not be any discernable landmark to distinguish the beginning or end of a specific portion. Thus, the above points serve as general reference points and are not intended to limit the shape, construction, or conformation of cushion 110. For example in FIG. 1A, cushion 110 is depicted as having symmetrical left and right halves. However, often an airbag cushion is not symmetrical, in which case left and right halves 170 and 180 do not comprise an exact division of cushion 110 in halves, but merely identify left and right portions.

Cushion 110 may further comprise one or more vents 115. Vents 115 are configured to allow inflation gas to pass from an interior volume of cushion 110 to outside cushion 110. U.S. Patent Publication No. 2007/0216146, which corresponds with U.S. patent application Ser. No. 11/589,316 discloses some examples of different types of vents. Application Ser. No. 11/589,316 is hereby incorporated by reference in its entirety.

Vents 115 may comprise discreet vents, which define a predetermined circumference and typically do not vary in their capacity to vent inflation gas during different stages of cushion 110 deployment or in response to different occupant conditions, such as out of position occupants.

Vents 115 may also comprise vents that can vary in their capacity to vent inflation gas during different stages of cushion 110 deployment, or in response to out of position or small occupants. Herein, these vents will generically be described as "closeable vents," although this type of vent may be configured to go though different cycles in its ability to vent inflation gas. For example a closeable vent may initially exist in a closed conformation, but during a full deployment cycle transition from at least partially closed, to at least partially opened, and back to at least partially closed. Further, closeable vents may be configured such that they initially exist in an at least partially open conformation and during the course of a normal deployment cycle become closed.

Vents 115 may further comprise an active closeable vent which is configured to respond to different occupant conditions, such that the closeable vent does not become closed during a deployment cycle if cushion 110 contacts an out of position occupant or object. In this case, the active vent is configured to reduce the pressure of inflation gas within the cushion such that the cushion is softer.

FIGS. 1C-1E depict a first step in a method for packaging cushion 110 such that the cushion will deploy with a predetermined deployment sequence, trajectory, and behavior. The packaging method may begin with a worker tucking in left and right sides 162 and 163 of base portion 160 and positioning the first approximately 270 millimeters (mm) of base portion 160 within housing 190, as depicted by $D_1$ in FIGS. 1B, 1D, and 1E. Additionally, this step may comprise flattening and straitening cushion 110, such that upper and lower occupant portions 130 and 140 as well as top and bottom portions 120 and 150 are positioned horizontally, as depicted in FIGS. 1C and 1E. A tack stitch 116 (FIG. 1D) may be employed to retain base 160 in the tucked conformation.

FIGS. 1E-1G depict a next step in the method from top and elevation views, wherein the step is performed by tucking top and bottom portions 120 and 150 into upper and lower portions 130 and 140 in the direction of housing 190 (depicted by the arrows in FIG. 1E). Top and bottom portions 120 and 150 are tucked into themselves "outside-in" toward housing 190. Leading edges 121 and 151 represent the furthest extent of tucked portions 122 and 152. Bottom portion 150 may be tucked such that leading edge 151 of tucked portion 152 extends a cabin-proximal side 194 of housing 190.

FIGS. 1F-1G depict various dimensions of cushion 110. FIG. 1F shows an over-all length $L_1$ of cushion 110 as well as distances $D_2$ and $D_3$. $D_2$ represents the distance to which leading edge 121 is tucked toward housing 190 from its original position on the periphery of cushion 110. Thus, $D_2$ also represents twice the length of tucked portion 122. Likewise, $D_3$ represents the distance to which leading edge 151 is tucked toward housing 190, and $D_3$ represents twice the length of tucked portion 152. $D_4$, in FIG. 1G, represents a distance from an upper edge 123 of tucked portion 122 to leading edge 121 of tucked portion 122, and therefore $D_4$ represents the length of tucked portion 122. $D_5$ represents a distance from a midline 195 of housing 190 to a top edge 123 of tucked bottom portion 122. $D_6$ represents a distance from midline 195 of housing 190 to a bottom edge 153 of tucked portion 152.

The length $L_1$ of cushion 110 may vary according to different applications, and therefore the exact measurements of $D_2$-$D_5$ may also vary. The following measurements are therefore offered by way of example, wherein in one embodiment, $L_1$=850 mm, $D_2$=360 mm, $D_3$=410 mm, $D_4$=180 mm, $D_5$=260 mm, and $D_6$=210 mm. Dimensions that are tunable to manipulate cushion 110 deployment characteristics include $D_5$ and $D_6$.

After the tucking step, a light tack stitch or tear stitch 119 may be applied to two or more tucked layers of cushion 110 in order to maintain the conformation of the tuck during further packaging of airbag cushion 110. Stitching 119 may be disposed on any portion of tucked portions 122 and 152, but may be preferentially applied to near the leading edge of the tuck. Tear stitching 119 applied to tucked portions 122 and 152 may be positioned in a center portion of the tucked portion, and therefore in a center portion of cushion 110. Further, tear stitching 119 may extend across the entire length of the leading edge, or only across a portion of the leading edge. It may be preferable to employ multiple sections of short tear stitches across side portions as well across the leading edge. Tear stitching 119 may be applied to two or more layers of cushion 110, up to the total number of layers comprising the tucked portion and the layers of cushion 110 above and below the tucked portion. In the embodiment shown in FIG. 1G, there are a total of four layers of cushion fabric in tucked portions 122 and 152 and the layers of cushion 110 above and below the tucked portions.

In one embodiment, tear stitching 119 includes, no more than 25 threads per 100 millimeters, although one skilled in the art will appreciate that other thread counts may similarly allow the rupture of stitching 119 during deployment without damaging cushion 110. Thus, tear stitching 119 is configured to rupture during deployment of cushion 110 without damaging the cushion and without retarding or altering cushion deployment.

After tucking top and bottom portions 120 and 150 toward housing 190 into upper and lower occupant portions 130 and 140, the next step in the method is to accordion-fold left and right portions 170 and 180. This step is depicted in FIGS. 1H-1J. Left and right portions 170 and 180 now include tucked portions 122 and 152. Accordion-folds are well known in the art and are made by alternatively folding a piece of fabric back upon itself, as depicted by arrows in FIG. 1H.

A first accordion-fold of the left half may be performed by placing a form or spacer on cushion 110, such as plate 30, and positioning it in a predetermined manner such that a fold may be performed, wherein the fold comprises a correct distance $W_2$ or $\frac{1}{2} W_2$. An outside edge of left half 170 may be folded over the form in the direction of housing 190 and then folded back toward the outside left edge of cushion 110 to the outside left edge of the form. Next, the free left edge of cushion 110 can be folded back toward the housing. According to this embodiment, the free outside left edge of cushion 110 ends up oriented toward a right side of cushion 110. The process is then repeated for the right half to yield the configuration shown in FIGS. 1I-1J. Additionally, a curved form or spacer may be used to allow for a fold which has a predetermined curved or non-linear shape, which may vary depending on the overall shape of cushion 110. The final configuration of this step is depicted in FIGS. 1I and 1J, wherein vents 115 are on a topmost layer of accordion-folds.

According to this embodiment, three folds should be made of each half of cushion 110, wherein each accordion-fold comprises some fraction of a total width $W_1$ of cushion 110, depicted in FIG. 1H. In other embodiments, the number of accordion-folds may vary according to the total width of cushion 110; for example, a cushion that is wider than cushion 110 may require a greater number of accordion-folds. Each fold typically comprises approximately the same amount of material, such that a distance across a fold should be approximately equal for each fold. Thus, distance $W_2$, which is depicted in FIGS. 1I and 1J, is about the same for each layer of the accordion-fold and for both the left and right accordion-folded portions 171 and 181. By way of example, and not of limitation, in one embodiment, $W_1$ is about 700 mm, $W_2$ is about 160 mm, and ½ $W_2$ is about 80 mm. Ratios of the above widths may vary according to various embodiments; for example, in one embodiment the ratio of $W_1$ to $W_2$ may vary up to about 10%. Width $W_2$ may or may not be narrower than a width of housing 190.

FIG. 1K depicts the tucked and accordion-folded cushion 110 from a side elevation cutaway view, wherein left and right accordion-folded portions of upper cushion 131 and left and right accordion-folded portions of lower cushion 141 are depicted. For clarity, FIGS. 1K-1O do not depict all the details of the different conformations of cushion 110, such as layers of accordion-folded portions 171 and 181; thus, FIGS. 1K-1O clearly illustrate the steps of the method for packaging cushion 110, but do not depict all of the details of the structures of cushion 110.

Referring to FIGS. 1K and 1L, a next step in the method for packaging cushion 110 is depicted, which comprises rolling left and right accordion-folded lower portion 141. A slider plate 30 may be placed on table 40 to provide a firm surface under portion 141. The step is performed by reverse rolling portion 141 as depicted in FIG. 1L. A reverse roll may also be called an inward roll, and is performed by a free end of portion 141 being rolled with a downward motion. The reverse roll is continued in the direction of housing 190 past cabin-proximal side 194 until continued rolling of portion 141 is blocked by upper left and right accordion-folded portions of upper portion 131 and a throat portion of cushion 110. Once left and right accordion-folded portions of lower portion 141 have been rolled, they are identified herein as rolled left and right accordion-folded lower portion 142, or they may simply be called portion 142.

A next step is depicted in FIG. 1M, and is performed by wrapping portion 131 over the top of portion 142 in the direction of cabin-proximal housing side 194. Note that the action performed in this step may not clearly be defined as folding or rolling, and therefore, is most accurately called "wrapping".

A next step is depicted in FIG. 1N, and is performed by folding portion 131 back across the top of rolled portion 142 in the direction of cabin-distal housing side 19. Thus, a bottom edge 132 of top portion 132 represents a fold and may be approximately even with a bottom-most edge of portion 142.

A next step is depicted in FIG. 1O, and is performed by folding portion 131 back again in the direction of cabin-proximal housing side 194. Thus, the steps depicted in FIGS. 1N and 1O may comprise an accordion-fold of portion 131. The accordion-folded, rolled, and wrapped cushion 110 is then placed within housing 190 via open face 192. When being placed within housing 190, cushion 110 is rotated about 45° in the direction of cabin-proximal side 194 of housing 190. A free end of portion 131 may be tucked between packaged cushion 110 and cabin-proximal side of housing 194, or between cushion 110 and a flap, if present.

FIG. 2A depicts cushion 110, wherein the cushion has been packaged into housing 190 according to the method described above and mounted in a vehicle 10. Additionally, optional flap 111 and a cosmetic cover 118 have been added to assembly 100. As can be seen in FIG. 2A, the embodiment of a method for packing cushion 110 results in a specific conformation of the cushion within housing 190, wherein base portion 160 is disposed adjacent to base portion 191 of housing 190. A center of mass of lower occupant portion 140 is above base portion 160 and below the center of mass of upper occupant portion 130. Top portion 120 is the most superficial, and may be disposed adjacent to cosmetic cover 118, or flap 111, if present. The center of mass of lower occupant portion 140 is more proximal to cabin-distal housing side 193 than the center of mass of upper occupant portion 130. Throat portion 165 of base portion 160 may be described as being adjacent to cabin-distal side 193, and may further be described as being more proximal to cabin-distal side 193 than the rest of cushion 110.

Flap 111 may be coupled to base portion 191 or cabin-proximal side 194 of housing 190 and may wrap around at least two sides of cushion 110. Flap 111 may comprise a deployment portion 112, and extension portion 113, and a free end 114. Free end of 114 may comprise accordion-folds, and may be adjacent to cosmetic cover 118. In some embodiments, an additional fabric wrap may be present whether or not flap 111 is present. Further, flap 111 may comprise one or more individual pieces of material coupled together.

The above disclosed method for packaging cushion 110 combines both the method for tucking, folding, and wrapping cushion 110 as well as the configuration of the different tucked, folded, and wrapped portions of cushion 110 within housing 190. It is a combination of the wrapping, folding, wrapping, and configuration within housing 190 that endows cushion 110 with a specific deployment trajectory and sequence, wherein the deployment trajectory is more horizontally oriented than traditional packing methods. Thus, the method disclosed above for packaging cushion 110 may render the cushion suitable for use in vehicles that have a low windshield rake. Windshield rake may be defined or quantified using one of several techniques, such as determining an angle between the top of an instrument panel and the windshield, or by measuring distances between one or more portions of the airbag housing and one or more portions of the windshield.

In one embodiment, the vehicle has a windshield rake of about 28 degrees, wherein the rake comprises an angle between a horizontal instrument panel surface and the windshield. As is depicted in FIG. 2A, the rake of a windshield may be determined by the distances between the junction of instrument panel 15 and windshield 20, and the cabin-distal side 193 of housing 190, taken in relation to the distance between airbag assembly 100 and windshield 20 at the cabin-distal side of the assembly, the middle of the assembly and the cabin-proximal side of the assembly. These distances are labeled $D_7$, $D_8$, $D_9$, and $D_{10}$, respectively. By way of example, and not of limitation, one example of a low rake windshield is one in which $D_7=100$ mm, $D_8=60$ mm, $D_9=100$ mm, and $D_{10}=150$ mm. The deployment characteristics instructed by the above disclosed method for packing cushion 110 may be useful in a vehicle that does not have a low or constricting vehicle rake. Specifically, the packing method results in a cushion/windshield interaction, wherein portions of the cushion that contact the windshield tend stay static with regard to the windshield. This characteristic may be at least partially tuned by varying distances $D_5$ and/or $D_6$.

Further, the above disclosed method for packing cushion 110, including the disposition of the disparate portions of cushion 110 within housing 190, dictate a specific deployment sequence, which is depicted in FIGS. 2A-2E. FIGS. 2A-2E depict airbag assembly 100 from a side elevation cutaway view, wherein the assembly is mounted in a vehicle 10. The deployment sequence begins with an inflator being activated in response to predetermined conditions. Inflation gas thereby begins to enter cushion 110 and begins to inflate cushion 110.

Figure 2B:
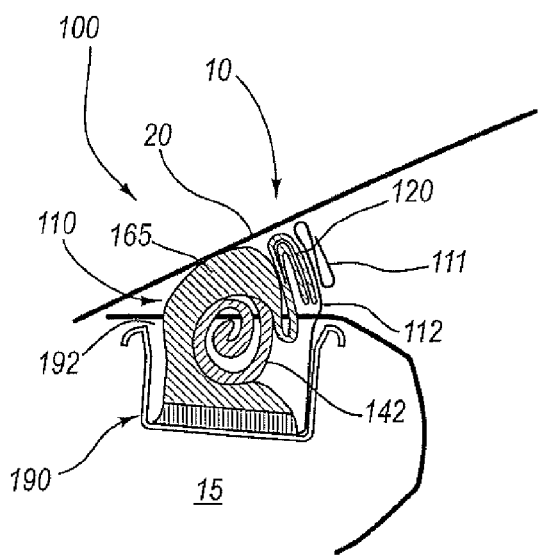
FIG. 2B is a side elevation view of the embodiment of the inflatable airbag assembly of FIG. 1A, wherein the airbag cushion has been installed in a vehicle and is at an early stage of a predetermined deployment sequence.

FIG. 2B depicts cushion 110 during an early stage of the deployment sequence. Throat portion 165 of base 160 and top portion 120 exit housing 190 via open face 192, thereby breaking through a cosmetic panel (not shown). An upper part of throat portion 165 contacts windshield 20 at a predetermined point. Another characteristic of the deployment sequence and trajectory that are imposed by the folding method, is that once a part of cushion 110 contacts a point on windshield 20, that specific part of cushion 110 tends to stay at that point on windshield 20, rather than contact windshield 20 and then slide up windshield 20. Deployment portion 112 of flap 111 typically precedes cushion 110 through the cosmetic cover and may function to protect cushion 110 from damage during deployment from parts of the cosmetic cover, housing 190 or instrument panel 15. Bottom portion 142 remains rolled and substantially un-inflated.

Figure 2C:
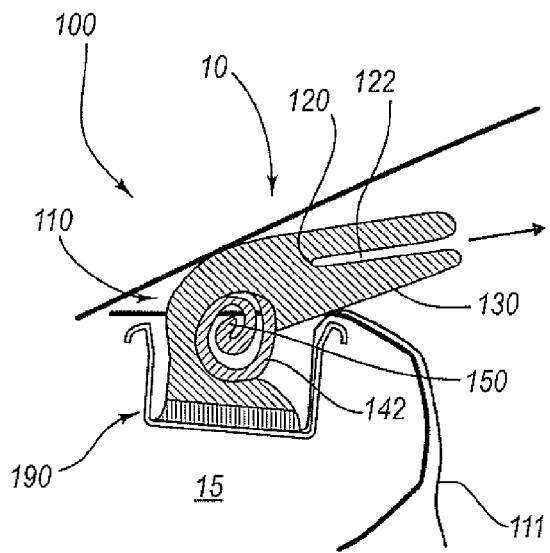
FIG. 2C is a side elevation view of the embodiment of the inflatable airbag assembly of FIG. 1A, wherein the airbag cushion is at a later stage of a predetermined deployment sequence.

FIG. 2C depicts cushion 110 during a later stage of the deployment sequence. Top portion 120 and upper occupant portion 130, which collectively may be referred to as a top portion, releases from housing 190, and begins to inflate. Tucked portion 122 begins to untuck. Bottom portion 150 and rolled/accordion-folded lower occupant portion 142 remain within housing 190, but may begin to be pulled out of the housing in the direction of the cabin of vehicle 10. Collectively portions 150 and 142 may be referred to as a bottom portion. Flap 111 may already be fully deployed, wherein it drapes over instrument panel 15, or it may still be deploying in front of cushion 110.

Figure 2D:
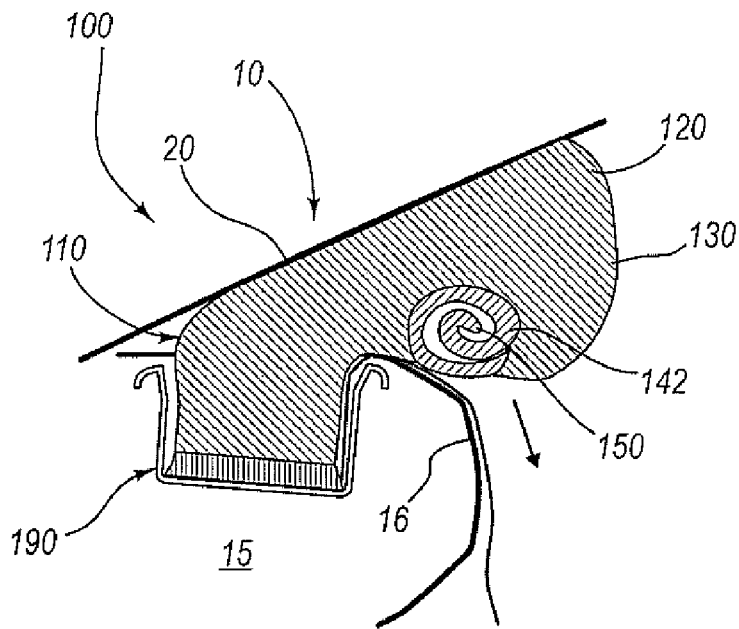
FIG. 2D is a side elevation view of the embodiment of the inflatable airbag assembly of FIG. 1A, wherein the airbag cushion is at a later stage of a predetermined deployment sequence.
Figure 2E:
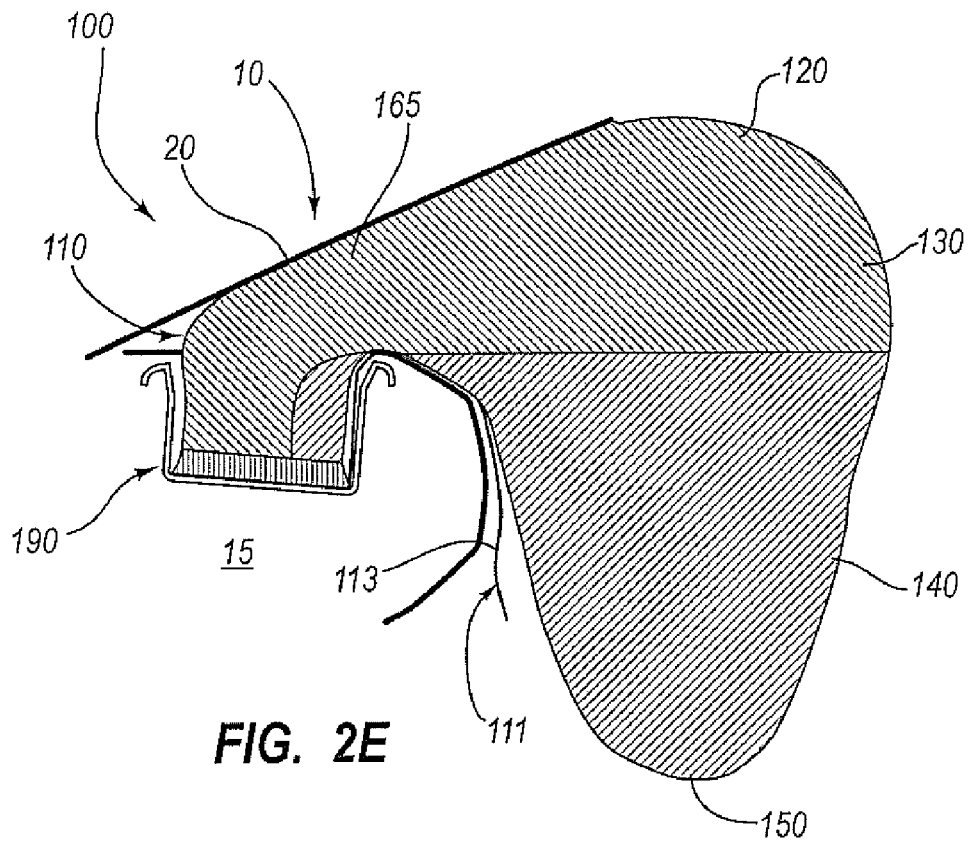
FIG. 2E is a side elevation view of the embodiment of the inflatable airbag assembly of FIG. 1, wherein the airbag cushion is fully deployed.

FIG. 2D depicts cushion 110 at a later stage of the deployment sequence. Top portion 120 and upper occupant portion 130, have cleared an edge 16 of instrument panel 15, and are substantially inflated. Bottom portion 150 and rolled/folded lower occupant portion 142 are still in their packaged conformations and may have cleared housing 190. Typically bottom and lower occupant portions 150 and 142 do not begin to inflate until they have at least partially cleared edge 16. An arrow depicts a predominate direction of travel for the lower portion of cushion 110. Note that the trajectory of lower portion deployment is predominately downward, and not horizontal. Thus, the top and bottom portions of cushion 110 may be described as having different predominate directions of trajectory during deployment.

FIG. 2E depicts cushion 110 at full inflation, which may also be called full deployment. Top portions 120 and 130 have fully inflated as have bottom portions 140 and 150. In the case of an out of position occupant, extension portion 113 of flap 111 may have altered the deployment sequence such that cushion 110 does not deploy anomalously. Throat portion 165 lies adjacent to windshield 20 and is coupled to housing 190.

In addition to the described deployment sequence, the disclosed embodiment of a method for packing cushion 110 causes cushion 110 to remain within a close proximity of instrument panel 15 during deployment, and as such provides another mechanism for protection out of position occupants from a premature impact with cushion 110.

FIGS. 3-8 depict another embodiment of an airbag assembly 200 and another method for packaging cushion 210. As with the previously described, the method described below causes cushion 210 to deploy with characteristics similar to those described above for cushion 110. These characteristics include a predetermined deployment sequence, deployment trajectory, and deployment distance between a lower portion of cushion 210 and an instrument panel. Assembly 200 may be configured similarly to assembly 100, except where the description of assembly 200 provided below differs from the one given for assembly 100, above.

FIG. 3 depicts part of another embodiment of an inflatable airbag cushion assembly 200 from a top elevation view. Airbag assembly 200 may comprise a cushion 210, a flap 211, one or more vents 215, a housing 290, and an inflator (not shown). Cushion 210 may be anchored to housing 290, and typically, a path for inflation gas exists such that cushion 210 can be in fluid communication with an inflator, via housing 290. Additionally, housing 290 may be one of several different types of airbag housing; such as fabric soft-pack housing, or a rigid housing comprising plastic, metal, or a combination of the two. Housing 290 may also comprise an extended portion, which defines a vehicle attachment member. Housing 290 may further comprise a base 291, an open face 292, a cabin-distal side 293, and a cabin-proximal side 294 (depicted in FIG. 4A). In a fully packaged state, wherein the housing contains a folded, rolled, and wrapped cushion, open face 292 may be considered as an airbag exit face of housing 290. Finally, an inflator may be disposed within the housing or may be positioned outside the housing, but in fluid communication with the airbag via the housing.

The shape of cushion 210 depicted in FIG. 3 is for illustrative purposes only, as the cushion may have various shapes. Cushion 210 may comprise a contiguous piece of material manufactured using a one-piece woven technique or may be manufactured by cutting and sewing two pieces of a nylon fabric. The above techniques and the material are well known in the art. Cushion 210 comprises a first side and a second side of material, which define a void between them, into which inflation gas may be forced thereby inflating the cushion.

In the view of FIG. 3, assembly 200 is in an extended, unpackaged state, such as during manufacture, wherein cushion 210 comprises a planar conformation. For example assembly 200 may be lying on a table such that housing 290 is disposed below cushion 210.

Figure 8:
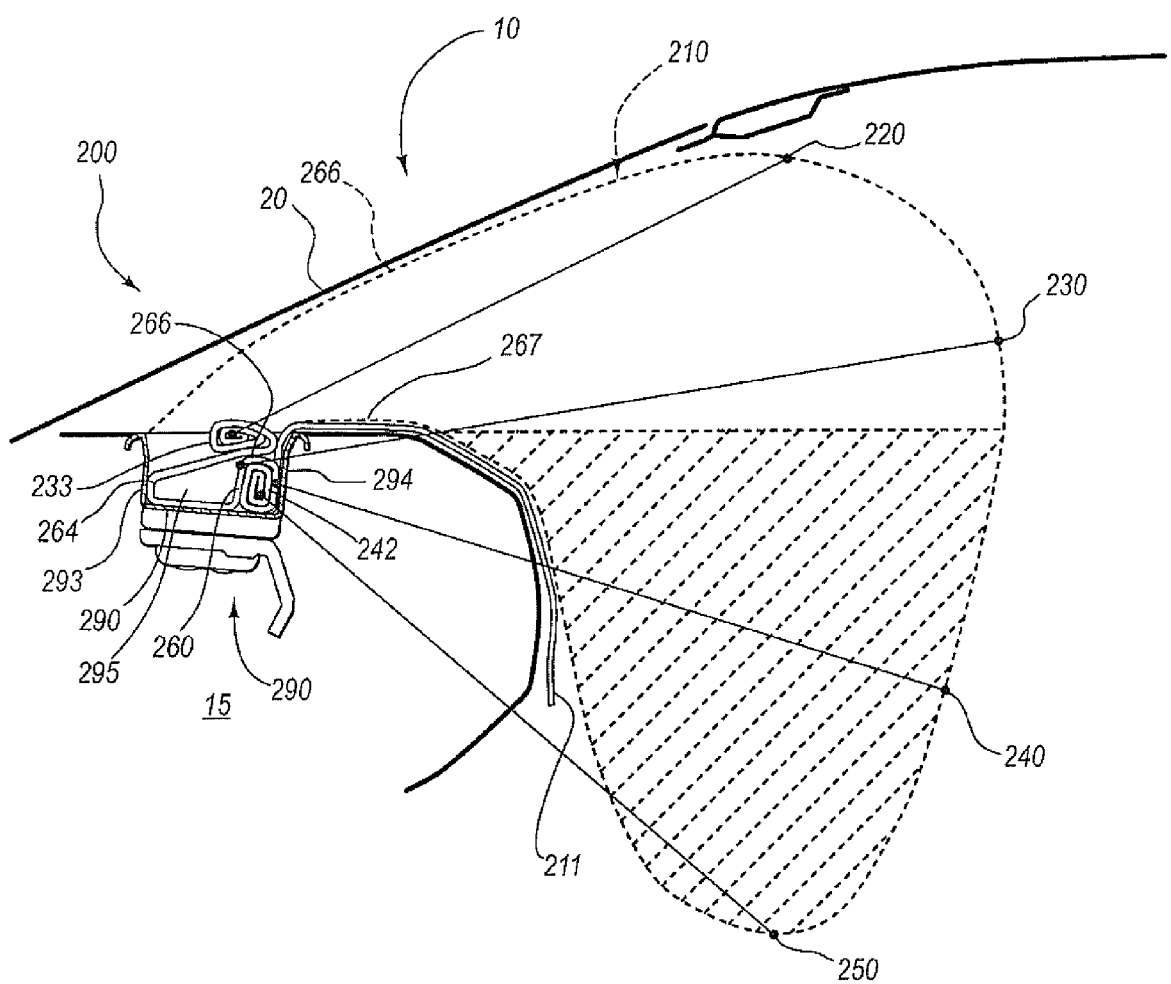
FIG. 8 is side elevation cutaway view of the inflatable airbag assembly of FIG. 3, wherein the assembly is mounted in a vehicle and the relative positions of different portions of the airbag cushion are identified in a packaged configuration and a deployed configuration; and, FIG. 9 is a side elevation cutaway view of another embodiment of an airbag assembly, wherein an airbag cushion has been packaged according to a predetermined method.

With reference now to FIGS. 3 and 8, various portions of cushion 210 are identified and discussed. Cushion 210 may comprise a top portion 220, an upper occupant portion 230, a lower occupant portion 240, a bottom portion 250, a base portion (not shown), a left portion 270, and a right portion 280. The various portions of cushion 210 do not necessarily comprise separate panels of material. Furthermore, there may not be any discernable landmark to distinguish the beginning or end of a specific portion. Thus, the above points serve as referenced portions and are merely for explanatory purposes.

Still with reference to FIGS. 3 and 8, top portion 220 partially defines a portion of cushion 210 that partially lies along and contacts windshield 20 of vehicle 10. With reference to a vehicle in its normal position, it may be said that top portion 220 defines the top part of cushion 210, including the top part of left and right sides as well as most of a back side and the top part of a front side. Upper occupant portion 230 defines an upper front portion of cushion 210, which is most likely to cushion an upper portion of an occupant. Lower occupant portion 240 defines a lower front portion of cushion 200, which is most likely to cushion a lower portion of an occupant. Portion 240 may be slightly conical in shape with the wide portion of the cone oriented up. Portion 240 may be called the "nose" or bottom portion of an airbag cushion. Bottom portion 250 defines the lowest portion of cushion 210 and may be described as being the bottom of the nose, or the bottom of lower portion 240. Base portion 260 is partially that portion of cushion 210 that is within housing 290 and may directly contact housing 290. Base portion may further 260 comprise an attachment point where cushion 210 is anchored to housing 290, and it is via base portion 290 that inflation gas first enters cushion 210. A throat portion 265 comprises an extension of base portion 260 and further comprises a top throat portion 266 and a bottom throat portion 267.

Referring again to FIG. 3, and with reference to a vehicle normally positioned on its wheels, cushion 210 comprises left and right portions 270 and 280, wherein the portions are meant to be an approximate division of the cushion and not an exact division. A length $L_2$ defines a total length of cushion 210. An inflatable portion of cushion is defined by a seam, here shown as stitching 217. The seam may be airtight and comprise airtight stitching, or the seam may comprise a combination of one or more of the techniques of stitching, gluing, RF welding, or any other suitable technique.

Flap 211 may comprise a piece of fabric of the same type as cushion 210, or may comprise a different material. Flap 211 may be configured to achieve different functions, depending on the length and configuration of flap 211, as discussed for flap 111, above. As depicted in FIG. 4A, flap 211 may comprise a deployment portion 212, an extension portion 213, and a free end 214. Further, flap 211 may comprise one or more individual pieces of material coupled together.

FIG. 4A depicts inflatable airbag cushion assembly 200 from a side elevation cutaway view, wherein cushion 210 is in the same conformation as depicted in FIG. 3. In FIG. 4A, top portion 220 is still considered as being above upper occupant portion 230, lower occupant portion 240 and bottom portion 250. Assembly 200 is depicted lying on a surface, such as a table, so that housing 290 is disposed beneath cushion 210.

The depiction of FIG. 4A represents one possible point from which a worker can start a method for packing cushion 210. Typically, before packaging cushion 210 is flattened and straightened such that there are no wrinkles or folds in the cushion, other than those that are necessary for the cushion 210 to adopt a planar conformation. Additionally, a worker will typically approximately center cushion 210 over housing 290. In one implementation of a method for packaging an airbag cushion such that it deploys as close to an instrument panel as possible, bottom portion 250 is tucked into itself, "outside-in", into lower occupant portion 240 in the direction of housing 290. During the tuck, the bottom portion of cushion 250 becomes a leading edge of the tuck 251. Bottom portion 250 may be tucked such that leading edge 251 extends to or past a cabin-proximal side 294 of housing 290 and may extend adjacent to a cabin-distal side 293, as depicted in FIG. 4B. Thus bottom portion 240 now comprises tucked portion 252.

Figure 5A:
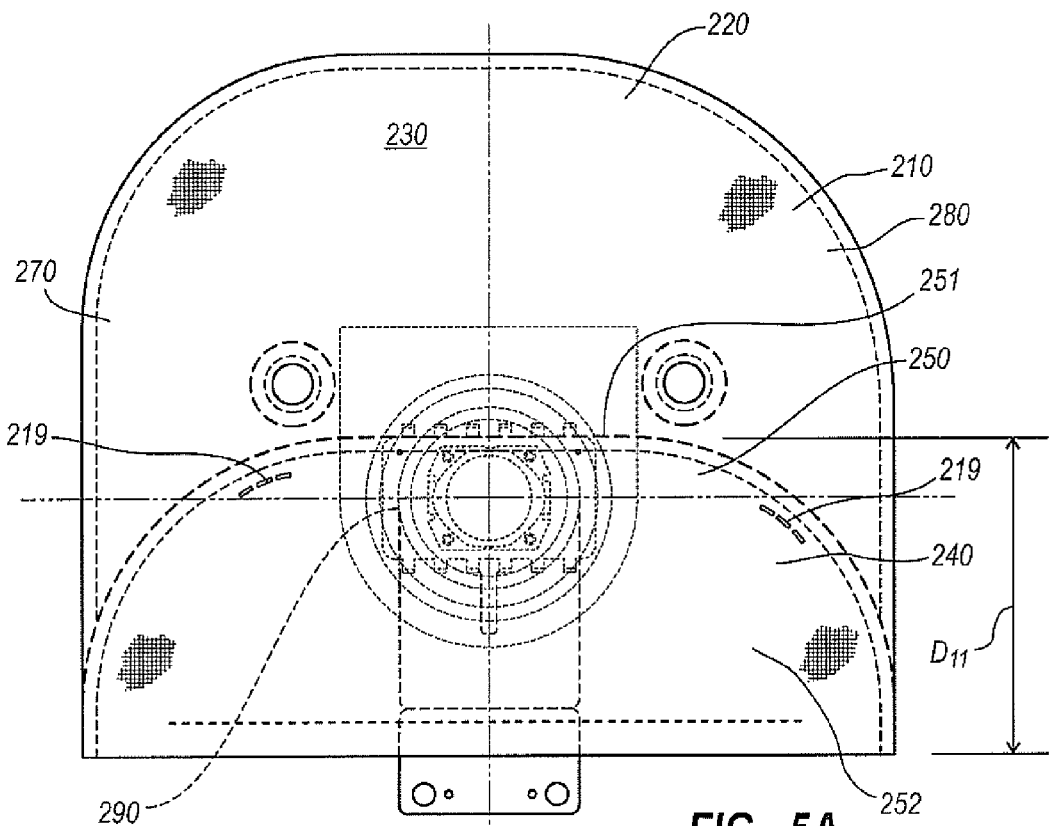
FIG. 5A is a top elevation view of the embodiment of the inflatable airbag assembly as depicted in FIG. 4B.

FIGS. 4B and 5A depict cushion 210 after the performance of this tucking step, from a side elevation cutaway view and a top elevation view, respectively. Bottom portion 250 has been tucked toward housing 290 into the lower occupant portion 240 and up into upper occupant portion 230. Thus, bottom portion 250 has been tucked into cushion 210 to a distance of over 50% of the length of cushion 210 prior to the tucking step. As such, distance $D_{11}$ may be greater than ¼ of distance $L_2$, depicted in FIG. 3A. In alternative embodiments, $D_{11}$ may be between about 20% and about 30%, including 25% of distance $L_2$. By way of example, and not by way of limitation, in one embodiment, $L_2$ is about 600 mm and $D_{11}$ is about 200 mm. In another embodiment, $L_2$ is about 850 mm and $D_{11}$ is about 400 mm. Thus, $L_2$ may range from about 600 mm to 850 mm; $D_{11}$ may range from about 200 mm to 400 mm; and, both $L_2$ and $D_{11}$ may vary in different embodiments due to several reasons, including a cushion of a different size than cushion 210 being used in a vehicle.

After the tucking step, a light tack stitch or tear stitch 219 may be applied to two or more layers of tucked portion 252 of in order to maintain the conformation of the tuck during further packaging of airbag cushion 210. Stitching 219 may be disposed on any portion of tucked portion 252, but may be preferentially applied near the leading edge of the tuck. Tear stitching 219 applied to tucked portion 252 may be positioned in a center portion of the tucked portion, and therefore in a center portion of cushion 210. Further, stitching 219 may extend across the entire length of the leading edge, or only across a portion of leading edge 251. It may be preferable to employ multiple sections of short tear stitches across side portions, across the leading edge 251, or both. Tear stitching 219 may be applied to two or more layers of cushion 210, up to the total number of layers comprising tucked portion 252 and the layers of cushion 210 above and below the tucked portion. In the embodiment of FIG. 4B, there are a total of four layers of cushion fabric in tucked portion 252 and the layers of cushion 210 above and below the tucked portion.

In one embodiment, tear stitching 219 includes no more than 25 threads per 200 millimeters, although one skilled in the art will appreciate that other thread counts may similarly allow the rupture of stitching 219 during deployment without damaging cushion 210. Thus, tear stitching 219 is configured to rupture during deployment of cushion 200 without damaging the cushion and without retarding or altering cushion deployment.

Figure 5B:
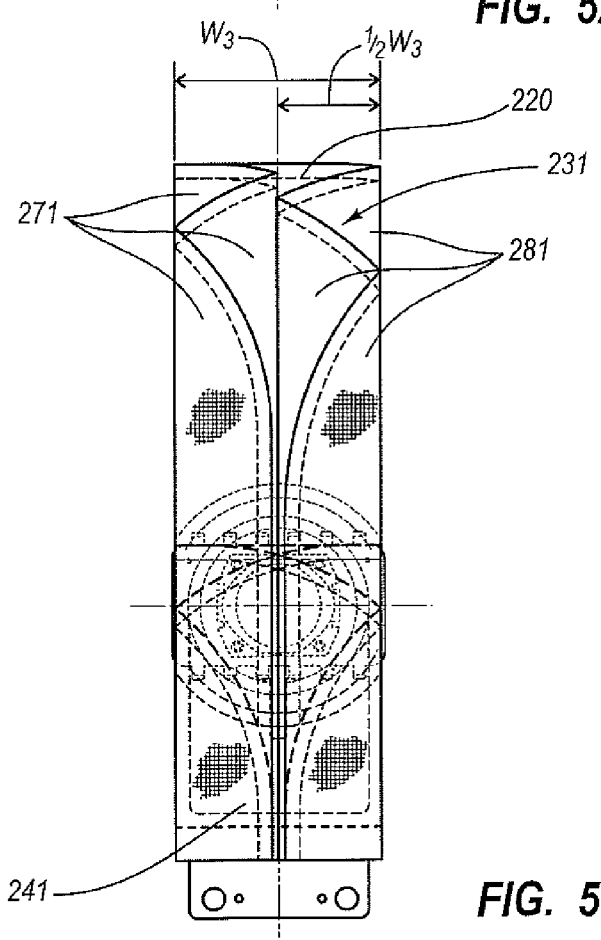
FIG. 5B is a top elevation view of the embodiment of the inflatable airbag assembly of FIG. 3, wherein the airbag cushion has undergone an additional step of a method for folding an airbag cushion.

After tucking bottom portion 250 toward housing 240 into upper occupant portion 230, the next step, shown in FIG. 5A, is to accordion-fold left and right portions 270 and 280. The result of making these accordion-folds is depicted in FIG. 5B, which is a front elevation view of airbag assembly 200. Accordion-folds are made by alternatively folding a piece of fabric back upon itself. Left and right accordion-folded portions 271 and 281 comprise some fraction of a total width of the unfolded cushion. Further, accordion-folded portions 271 and 281 added together are roughly equal to a total width $W_3$ of the accordion-folded cushion 210, as depicted in FIG. 5B.

According to this embodiment, three folds each should be made left and right portions 271 and 281 of cushion 210. Each fold typically comprises approximately the same amount of material, such that a distance across a fold should be approximately equal for each fold. Thus, in FIG. 5B, the width ½ $W_3$ is approximately the same for each layer of the accordion-fold and for both the left and right portions 271 and 281. The actual width of each accordion-fold may be determined by the width of housing 290. The width of the accordion-folds may be adjusted such that the left and right folds touch or abut each other, wherein the folds are approximately centered over housing 290. The depicted embodiment comprises three accordion folds; however the number of accordion-folds may be altered based on a total width of cushion 210.

A first accordion-fold of the left half may be performed by placing a form or spacer on cushion 210 and positioning it in a predetermined position such that a fold may be performed, wherein the fold comprises a correct distance ½ $W_3$. Additionally, a form or spacer may be used to allow for a fold which has a predetermined curved or non-linear shape, which may vary depending on the overall shape of cushion 210. The final configuration of this step is depicted in FIG. 5B, and may be similar or identical to the conformation depicted in FIG. 1J. In alternative embodiments, a topmost accordion fold may not comprise the full width of ½ $W_3$, but rather only comprises a portion of the full width of the other accordion-folds. Accordion-folded top portion 231 now comprises the upper left and right accordion-folded portions 271 and 281, including top portion 220. Likewise, accordion-folded lower portion 241 now comprises the tucked lower left and right accordion-folded portions 271 and 281.

FIGS. 6A-6F depict the next steps of the method for packing airbag cushion 210 of assembly 200 from a side elevation cutaway view. As in FIG. 1E, the assembly may be thought of as being placed in an assembly table, wherein housing 290 fits into a recess or cutout of the table. The views of FIGS. 6A-6F have been turned 90° clockwise and flipped horizontally compared to FIG. 1E. For the sake of clarity, not all structural details of cushion 210 are illustrated, for example, the accordion-folds of the upper and lower portions of cushion 210 are not shown. As such names associated with reference numbers indicate structure, for example, reference number 241 represents the tucked and accordion-folded portions of lower portion 240.

FIGS. 6A-B depict a first step in the method, wherein tucked and accordion-folded portions of lower portion 241 of cushion 210 is reverse rolled. As above, "reverse rolled" is intended to indicate that a free end of tucked portion 252 is initially rolled in the direction of base 291 of housing 290. A free end of tucked portion 252 may initially be said to be folded, rather than rolled. Portion 242 is rolled approximately three times until it is approximately even with cabin-proximal side 294 of housing 290. Upon being rolled, portions 231 and 241 will hereafter be referred to as portions 233 and 242. Portion 233 represents the accordion-folded and reverse rolled upper portions of cushion 210 and portion 242 represents the tucked, accordion folded and reverse rolled lower portions of cushion 210.

FIG. 6C depicts a next step in the method, or may it may be said that it depicts the same step as FIGS. 6A-6B, but at a later part of the step. Rolled portion 242 is then placed within housing 290 via open face 292, and is laid adjacent to side 294 and base 291 of housing, or flap 211, if present. A throat portion 265 of base portion 260 of cushion 210 lies on a cabin-distal side of portion 242.

FIGS. 6D-F depict a next step in the method, wherein accordion-folded portions of upper portion 231 of cushion 210 is reverse rolled. As above, "reverse rolled" is intended to indicate that a free end of top portion 220 is initially rolled in the direction of base 291 of housing 290. The free end of top portion 231 may initially be said to be folded, rather than rolled (FIGS. 6D-6E). Portion 231 may be rolled approximately three times and placed into housing 290 via open face 292. Portion 233 is placed adjacent to cabin-proximal side 294 of housing 290 and directly on top of the rolled and accordion-folded portion 242 such that an upper part of throat portion 265 lies between portions 233 and 242. Flap 211 may then be wrapped across the packaged cushion 210 and may be accordion-folded and lay on the open face 292 side of cushion 210. Alternatively, flap 211 may not be folded, but depending on its length, it may be tucked between cushion 210 and side 293, or may simply lie on the open face 292 side of cushion 210. Further, flap 211 may be attached to housing 290 via housing hooks, or other suitable structures, wherein the flap forms a topmost surface of the tucked, folded and rolled cushion 210 such that the flap acts as a cushion retaining flap.

FIG. 6F depicts a tool-point or fold 264 in cushion 210, wherein the fold may comprise a broad or rounded fold and may be formed using a tool or form. Fold 264 is configured to help cushion 210 adopt a predetermined configuration such that during deployment, an upper occupant portion of cushion 210 is inflated before a lower occupant portion of the cushion. Fold 264 defines an interior space, which is at least partially defined by cushion 210.

Figure 7:
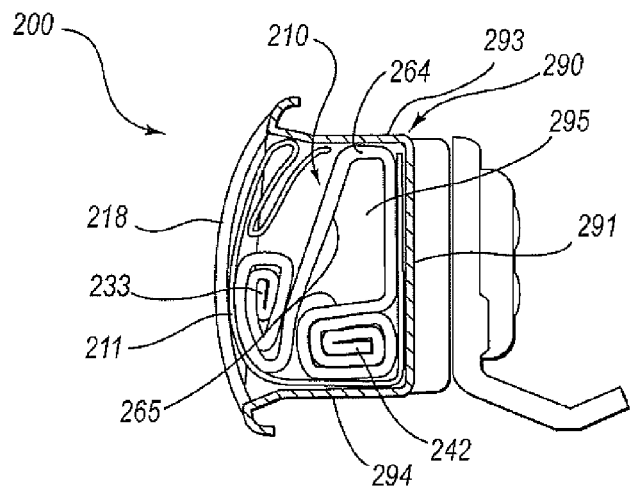
FIG. 7 is a side elevation cutaway view of the embodiment of the inflatable airbag assembly of FIG. 3, wherein the airbag cushion has completed a method for folding an airbag cushion and is ready to be installed in a vehicle.

FIG. 7 depicts cushion 210, wherein it has been packaged according to the above method, and a cosmetic cover 218 has been added. As such, assembly 200 may be ready for installation in a vehicle. The particular relationships between flap 211, portion 233, and portion 242, and their disposition within housing 290 are products of the method for packing, described above.

Portion 242 may be referred to as a bottom portion of cushion 210 and portion 233 may be referred to as a top portion of cushion 210. As such, a center of mass of the bottom portion of cushion 210 is disposed closer to a base 291 of housing 290 than a center of mass of a top portion of cushion 210. Therefore, when housing 290 is packed with cushion 210 and mounted in a vehicle, it can be said that the upper portion lies above the bottom portion of cushion 210. Portion 242 is disposed adjacent to cabin-proximal housing side 294 and portion 233 is disposed adjacent to cabin-proximal housing side 194 and on top of portion 242 such that an upper part of throat portion 265 is disposed between portions 233 and 242.

Cushion 210 also comprises a tool-point or fold 264, which may comprise a broad or rounded fold and may be formed using a tool or form. Fold 264 is configured to help cushion 210 adopt a predetermined configuration such that during deployment, an upper occupant portion of cushion 210 is inflated before a lower occupant portion of the cushion. Fold 264 creates and partially defines an interior space 295, which may be called a valley. As with fold 264, interior space 295 helps to position portions 233 and 242 within housing 290 such that they can act more independently during airbag cushion deployment than they would if the fold and/or the interior space were not present.

FIG. 8 depicts both the packaged and fully inflated conformations of cushion 210, wherein assembly 200 has been installed in a vehicle 10. A deployment sequence of cushion 210 is predetermined by the above packaging method, and is very similar to the deployment sequence of cushion 110 depicted in FIGS. 2B-2E and associated text. For clarity, cosmetic cover 218 has been omitted from FIG. 8.

Flap 211 is not depicted in the folded state, but in the fully deployed conformation may lie between instrument panel 15 and cushion 210, particularly throat portion 265 and the bottom occupant portion of cushion 210, depicted in cross-hatching. Cushion 210 has been folded such that the cushion conformation comprises a fold 264 and an interior space 295.

A top part 266 of the throat may be partially disposed within rolled portion 233 in the packaged configuration, and in the deployed configuration may extend from cabin-distal side 293 of housing 290 to a roof-proximal portion of windshield 20. Top part 266 of the throat is disposed between upper occupant portion 233 and bottom occupant portion 242. A bottom portion 267 of the throat may be partially disposed within rolled portion 242 in the packaged configuration, and in the deployed configuration, may extend from cabin-proximal side 294 of housing 290 to a cabin-proximal portion of instrument panel 15.

Top portion 220 and upper occupant portion 230 of cushion 210 are disposed within the accordion-folded and rolled portion 233 in the packaged conformation. Lower occupant portion 240 and bottom portion 250 of cushion 210 are disposed within the tucked, accordion-folded, and rolled portion 242 in the packaged conformation.

As with the method for packaging cushion 110, the method of packing cushion 210 is predetermined to instruct similar deployment characteristics as those discussed for cushion 110. Specifically, cushion 210 displays a "hugging" behavior during deployment such that a back panel of cushion 210 remains in close proximity to instrument panel throughout the deployment sequence.

Figure 9:
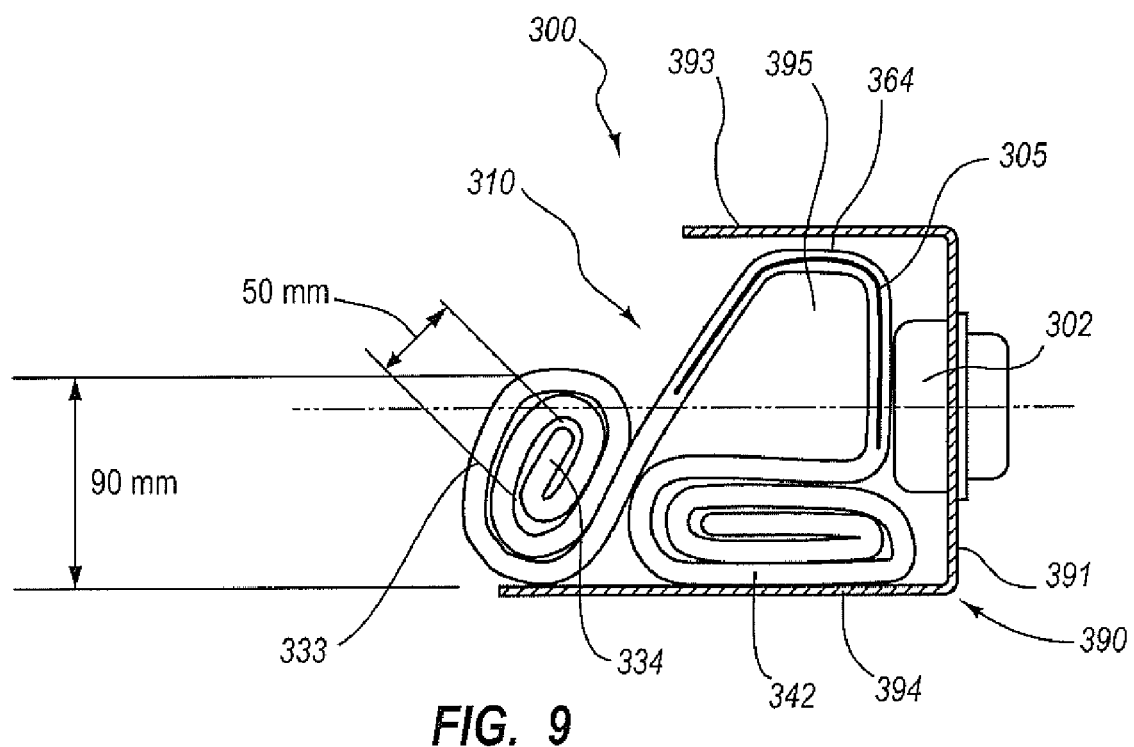

FIG. 9 is a side elevation cutaway view of another embodiment of an airbag assembly 300, wherein an airbag cushion 310 has been packaged according to the method of FIGS. 3-8 and the text associated therewith. Assembly 300 may be configured similarly to and may function similarly as airbag assemblies 100 and 200, described herein, except where the following description of assembly 300 varies from the previous description of assemblies 100 and 200. In the depicted embodiment, airbag assembly 300 comprises an inflator 302, a diffuser 305, an airbag cushion 310, and a housing 390. Inflator 302 may be of any type well known in the art, including a pyrotechnic, stored gas, or combination inflator. Further, inflator 302 may comprise a single or multistage inflator.

Cushion 310 comprises a first side and a second side of material, which define a void between them, into which inflation gas may be forced, thereby inflating the cushion. Diffuser 305 is disposed between the first and second sides of cushion 310, and may be anchored to the cushion, inflator 302, or both. Diffuser 305 may be of any type well known in the art, which typically comprise at least one piece of fabric that is configured to direct inflation gas to one or more predetermined locations within cushion 310. Additionally, diffuser 305 may direct inflation gas towards one or more vents, which may be configured to allow inflation gas to exit the inflatable void of cushion 310.

Housing 390 may be one of several different types of airbag housing; such as fabric soft-pack housing, or a rigid housing comprising plastic, metal, or a combination of the two. Housing 390 may also comprise an extended portion, which defines a vehicle attachment member. Housing 390 may further comprise a base 391, an airbag exit face 392, a cabin-distal side 393, and a cabin-proximal side 394. In the depicted embodiment, housing 390 has asymmetric cabin-proximal and cabin-distal sides 393 and 394, wherein the cabin-distal side is longer than the cabin-proximal side.

FIG. 9 depicts cushion 310 as having been packaged according to the method described in FIGS. 3-8 and text associated therewith, wherein the cushion comprises a rolled and accordion-folded upper occupant portion 333 and a rolled and accordion-folded occupant lower portion 342. A first roll 334 of rolled portion 333 is approximately 50 mm. As depicted in FIG. 9, when portion 333 is in its final packaged configured, it is configured to span a distance of about 90 mm from a cabin-proximal side of portion 333 to a cabin-distal side of portion 333.

Cushion 310 also comprises a tool-point or fold 364, which may comprise a broad or rounded fold and may be formed using a tool or form. Fold 364 is configured to help cushion 310 adopt a predetermined configuration such that during deployment, an upper occupant portion of cushion 310 is inflated before a lower occupant portion of the cushion. Fold 364 creates and partially defines an interior space 395, which may be called a valley. As with fold 364, interior space 395 helps to position portions 333 and 342 within housing 390 such that they can act more independently during airbag cushion 310 deployment than they would if the fold and/or the interior space were not present.

In the depiction of FIG. 9, airbag assembly 300 has been packaged according to the packaging method described in FIGS. 3-8 and associated text. Therefore, airbag assembly 300 is configured to deploy with a predetermined deployment sequence as well as deploying with predetermined characteristics, wherein a lower occupant portion of airbag cushion 310 has an instrument panel hugging behavior.

The methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Without further elaboration, it is believed that one skilled in the art can use the preceding description to utilize the invention to its fullest extent. The examples and embodiments disclosed herein are to be construed as merely illustrative and not a limitation of the scope of the present invention in any way. It will be apparent to those having skill in the art that changes may be made to the details of the above-described embodiments without departing from the underlying principles of the invention. In other words, various modifications and improvements of the embodiments specifically disclosed in the description above are within the scope of the appended claims. The scope of the invention is therefore defined by the following claims. Note also that elements recited in means-plus-function format are intended to be construed in accordance with 35 U.S.C. §112 ¶6.

The invention claimed is:

1. An airbag assembly comprising:
   an inflator configured to expel inflation gas in response to predetermined conditions; and
   a packaged inflatable airbag cushion in fluid communication with the inflator,
      wherein the cushion is coupled to and contained within a housing,
      wherein the cushion comprises two opposing layers of material,
   which further comprise a front face and a rear face,
      wherein the cushion comprises a throat portion that further comprises a base portion that is coupled to a housing,
      wherein the cushion comprises an upper occupant portion, a lower occupant portion, a left portion, and a right portion,
      wherein the base portion of the cushion is disposed adjacent to a base portion of the housing,
   wherein a bottom portion is been tucked into the lower occupant portion toward the housing, the left and right portions are accordion-folded such that the upper occupant portion and the lower occupant portion each comprise left and right portions that are respectively accordion-folded, and then followed by reverse rolling of the lower occupant portion of the cushion,
   wherein the cushion is packaged into the housing in a packaged configuration such that the accordion-folded left and right portions of the upper occupant portion of the cushion are disposed on top of the reverse rolled lower occupant portion of the cushion, and
   wherein, in the packaged configuration, the upper occupant portion of the cushion is adjacent to a cabin-proximal side of the housing, such that a center of mass of the packaged lower occupant portion is disposed nearer the base portion of the housing and nearer a cabin-distal side of the housing than is the center of mass of the upper occupant portion.

2. The airbag assembly of claim 1, wherein the tucked bottom portion in the lower occupant portion of the airbag cushion is held in place by tear stitching.

3. The airbag assembly of claim 1, wherein the cushion is deployed from a housing mounted in an instrument panel of a vehicle, wherein a top surface of the instrument panel into which the housing is mounted is substantially horizontally oriented such that an exit face of the housing is horizontally oriented such that the exit face is within 60 mm of a windshield.

4. The airbag assembly of claim 1, wherein the windshield is characterized as having a low rake, wherein the cabin-distal side of the housing is about 100 mm from a junction of the instrument panel and the windshield, and wherein the cabin-distal side of the housing is about 60 mm from the windshield, a midpoint of the housing is about 100 mm from the windshield, and the cabin-proximal side of the housing is about 150 mm from the windshield.

5. The airbag assembly of claim 1, wherein the packaged configuration of the airbag cushion enables deployment with predetermined characteristics, comprising:
the upper occupant portion exiting the airbag housing, upon deployment of the airbag cushion, before the lower occupant portion such that the upper occupant portion is at least partially inflated while the lower occupant portion remains reverse rolled and remains within the housing,
the lower occupant portion remaining at least partially reverse rolled while it is pulled out of the airbag housing, and,
the lower occupant portion initially travelling in a direction that is substantially horizontal and then traveling in a direction that is substantially downward and substantially perpendicular to the initial direction of travel of the lower occupant portion such that the lower occupant portion remains in close proximity to an instrument panel throughout deployment of the lower occupant portion.

6. The airbag assembly of claim 1, wherein the tucked the bottom portion into the lower occupant portion yields a leading edge.

7. The airbag assembly of claim 1, wherein a top portion is tucked into the upper occupant portion toward the housing.

8. The airbag assembly of claim 1, wherein the upper occupant portion is reversed rolled such that the upper occupant portion comprise left and right portions that are respectively accordion-folded and reverse-rolled.

9. An airbag assembly comprising:
an inflator configured to expel inflation gas in response to predetermined conditions; and
a packaged inflatable airbag cushion in fluid communication with the inflator,
wherein the cushion is coupled to and contained within a housing, wherein the cushion comprises two opposing layers of material, which further comprise a front face, a rear face, a left portion, and a right portion,
wherein the rear face comprises a throat portion that further comprises a base portion that is coupled to a housing, the front face comprising an upper occupant portion and a lower occupant portion,
wherein in a packaged configuration, the base portion of the cushion is disposed adjacent to a base portion of the housing,
wherein a bottom portion is been tucked into the lower occupant portion toward the housing with the cushion removed positioned such that the upper occupant portion and the lower occupant portion extend from the housing in opposing directions, the left and right portions are accordion-folded such that the upper occupant portion and the lower occupant portion each comprise left and right portions that are respectively accordion-folded, and is reversed rolled of the lower occupant portion of the cushion
wherein the cushion is packaged into the housing in the packaged configuration such that the accordion-folded, left and right portions of the upper occupant portion of the cushion are disposed on top of the reverse rolled lower occupant portion of the cushion, and
wherein, in the packaged configuration, a top portion is located adjacent to a cabin-proximal portion of the housing such that the top portion is positioned closer to a cover than the packaged lower occupant portion.

10. The airbag assembly of claim 9, wherein the tucked bottom portion in the lower occupant portion of the airbag cushion is held in place by tear stitching.

11. The airbag assembly of claim 9, wherein the cushion is deployed from a housing mounted in an instrument panel of a vehicle, wherein a top surface of the instrument panel into which the housing is mounted is substantially horizontally oriented such that an exit face of the housing is horizontally oriented such that the exit face is within 60 mm of a windshield.

12. The airbag assembly of claim 9, wherein the windshield is characterized as having a low rake, wherein the cabin-distal side of the housing is about 100 mm from a junction of the instrument panel and the windshield, and wherein the cabin-distal side of the housing is about 60 mm from the windshield, a midpoint of the housing is about 100 mm from the windshield, and the cabin-proximal side of the housing is about 150 mm from the windshield.

13. The airbag assembly of claim 9, wherein the packaged configuration of the airbag cushion enables deployment with predetermined characteristics, comprising:
the upper occupant portion exits the airbag housing, upon deployment of the airbag cushion, before the lower occupant portion such that the upper occupant portion is at least partially inflated while the lower occupant portion remains reverse rolled and remains within the housing,
the lower occupant portion remaining at least partially reverse rolled while it is pulled out of the airbag housing, and,
the lower occupant portion initially travels in a direction that is substantially horizontal and then travels in a direction that is substantially downward and substantially perpendicular to the initial direction of travel of the lower occupant portion such that the lower occupant portion remains in close proximity to an instrument panel throughout deployment of the lower occupant portion.

14. The airbag assembly of claim 9, wherein the tucked bottom portion into the lower occupant portion yields a leading edge.

15. The airbag assembly of claim 9, wherein the top portion is tucked into the upper occupant portion toward the housing.

16. The airbag assembly of claim 9, wherein the upper occupant portion is accordion-folded onto itself.

* * * * *